US011263228B2

(12) United States Patent
Koch et al.

(10) Patent No.: US 11,263,228 B2
(45) Date of Patent: *Mar. 1, 2022

(54) CONTINUOUSLY SCROLLABLE CALENDAR USER INTERFACE

(71) Applicant: Asana, Inc., San Francisco, CA (US)

(72) Inventors: Vanessa Koch, San Francisco, CA (US); Justin Michael Rosenstein, San Francisco, CA (US); Jacqueline Bavaro, San Francisco, CA (US)

(73) Assignee: Asana, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/025,649

(22) Filed: Sep. 18, 2020

(65) Prior Publication Data

US 2021/0004380 A1    Jan. 7, 2021

Related U.S. Application Data

(63) Continuation of application No. 14/584,804, filed on Dec. 29, 2014, now Pat. No. 10,810,222.

(Continued)

(51) Int. Cl.
*G06F 16/25* (2019.01)
*G06F 3/0485* (2022.01)
(Continued)

(52) U.S. Cl.
CPC .......... *G06F 16/252* (2019.01); *G06F 3/0482* (2013.01); *G06F 3/0484* (2013.01);
(Continued)

(58) Field of Classification Search
CPC .... G06F 3/0485; G06F 3/0482; G06F 16/252; G06F 16/2477; G06F 16/24578;
(Continued)

(56) References Cited

U.S. PATENT DOCUMENTS 5,233,687 A    8/1993  Henderson, Jr.
5,524,077 A    6/1996  Faaland
(Continued)

FOREIGN PATENT DOCUMENTS

CN    102378975 B       5/2015
WO    2015036817 A1     3/2015
WO    2015123751 A1     8/2015

OTHER PUBLICATIONS

"U.S. Appl. No. 14/584,750, Examiner Interview Summary dated Feb. 25, 2016", 3 pgs.
(Continued)

*Primary Examiner* — Sherrod L Keaton
(74) *Attorney, Agent, or Firm* — Esplin & Associates, PC

(57) ABSTRACT

A method is provided to scroll a calendar user interface (UI) comprising: displaying on a device display screen a visible range of a calendar UI, wherein the calendar UI includes a display grid that includes individual date display panes that are associated with individual dates, wherein the date panes are arranged in rows corresponding to weeks and columns corresponding to days of the week and wherein the visible range of the calendar UI includes multiple rows of date panes; receiving user input to indicate a scroll direction in which to scroll the display grid to display a different date range that includes earlier or later date display panes; and in response to the user input, scrolling the calendar UI by rows to the different date range.

20 Claims, 23 Drawing Sheets

Related U.S. Application Data

(60) Provisional application No. 62/094,599, filed on Dec. 19, 2014, provisional application No. 62/083,832, filed on Nov. 24, 2014.

(51) Int. Cl.
| | |
|---|---|
| *H04L 67/02* | (2022.01) |
| *G06F 3/0482* | (2013.01) |
| *G06F 16/248* | (2019.01) |
| *G06F 16/951* | (2019.01) |
| *G06F 16/2458* | (2019.01) |
| *G06F 16/2457* | (2019.01) |
| *G06Q 10/10* | (2012.01) |
| *H04L 67/01* | (2022.01) |
| *G06F 16/44* | (2019.01) |
| *G06F 3/0484* | (2022.01) |
| *H04L 67/10* | (2022.01) |

(52) U.S. Cl.
CPC .......... *G06F 3/0485* (2013.01); *G06F 16/248* (2019.01); *G06F 16/2477* (2019.01); *G06F 16/24578* (2019.01); *G06F 16/447* (2019.01); *G06F 16/951* (2019.01); *G06Q 10/109* (2013.01); *H04L 67/02* (2013.01); *H04L 67/10* (2013.01); *H04L 67/42* (2013.01)

(58) Field of Classification Search
CPC ... G06F 16/951; G06F 3/0484; G06Q 10/109; H04L 67/02; H04L 67/10; H04L 67/42
USPC .......................................................... 715/739
See application file for complete search history.

(56) References Cited

U.S. PATENT DOCUMENTS

| | | |
|---|---|---|
| 5,623,404 A | 4/1997 | Collins |
| 5,721,770 A | 2/1998 | Kohler |
| 5,983,277 A | 11/1999 | Heile |
| 6,024,093 A | 2/2000 | Cron |
| 6,256,651 B1 | 7/2001 | Tuli |
| 6,292,830 B1 | 9/2001 | Taylor |
| 6,621,505 B1 | 9/2003 | Beauchamp |
| 6,629,081 B1 | 9/2003 | Cornelius |
| 6,769,013 B2 | 7/2004 | Frees |
| 6,859,523 B1 | 2/2005 | Jilk |
| 7,020,697 B1 | 3/2006 | Goodman |
| 7,039,596 B1 | 5/2006 | Lu |
| 7,086,062 B1 | 8/2006 | Faour |
| 7,349,920 B1 | 3/2008 | Feinberg |
| 7,418,482 B1 | 8/2008 | Lusher |
| 7,428,723 B2 | 9/2008 | Greene |
| 7,640,511 B1 | 12/2009 | Keel |
| 7,676,542 B2 | 3/2010 | Moser |
| 7,805,327 B1 | 9/2010 | Schulz |
| 7,917,855 B1 | 3/2011 | Satish |
| 7,996,744 B2 | 8/2011 | Ojala |
| 7,996,774 B1 | 8/2011 | Sidenur |
| 8,214,747 B1 | 7/2012 | Yankovich |
| 8,314,809 B1 | 11/2012 | Grabowski |
| 8,499,300 B2 | 7/2013 | Zimberg |
| 8,522,240 B1 | 8/2013 | Merwarth |
| 8,527,287 B1 | 9/2013 | Bhatia |
| 8,554,832 B1 | 10/2013 | Moskovitz |
| 8,572,477 B1 | 10/2013 | Moskovitz |
| 8,627,199 B1 | 1/2014 | Handley |
| 8,639,552 B1 | 1/2014 | Chen |
| 8,768,751 B2 | 7/2014 | Jakowski |
| 8,831,879 B2 | 9/2014 | Stamm |
| 8,843,832 B2 | 9/2014 | Frields |
| 8,863,021 B1 | 10/2014 | Bee |
| 9,009,096 B2 | 4/2015 | Pinckney |
| 9,024,752 B2 | 5/2015 | Tumayan |
| 9,143,839 B2 | 9/2015 | Reisman |
| 9,152,668 B1 | 10/2015 | Moskovitz |
| 9,201,952 B1 | 12/2015 | Chau |
| 9,208,262 B2 | 12/2015 | Bechtel |
| 9,251,484 B2 | 2/2016 | Cantor |
| 9,350,560 B2 | 5/2016 | Hupfer |
| 9,383,917 B2 | 7/2016 | Mouton |
| 9,405,532 B1 | 8/2016 | Sullivan |
| 9,405,810 B2 | 8/2016 | Smith |
| 9,454,623 B1 | 9/2016 | Kaptsan |
| 9,514,424 B2 | 12/2016 | Kleinbart |
| 9,600,136 B1 | 3/2017 | Yang |
| 9,712,576 B1 | 7/2017 | Gill |
| 9,785,445 B2 | 10/2017 | Mitsui |
| 9,842,312 B1 | 12/2017 | Rosati |
| 9,949,681 B2 | 4/2018 | Badenes |
| 9,959,420 B2 | 5/2018 | Kiang |
| 9,978,040 B2 | 5/2018 | Lee |
| 9,990,636 B1 | 6/2018 | Lewis |
| 10,001,911 B2 | 6/2018 | Breedvelt-Schouten |
| 10,003,693 B2 | 6/2018 | Wolthuis |
| 10,083,412 B2 | 9/2018 | Suntinger |
| 10,157,355 B2 | 12/2018 | Johnson |
| 10,192,181 B2 | 1/2019 | Katkar |
| 10,235,156 B2 | 3/2019 | Johnson |
| 10,264,067 B2 | 4/2019 | Subramani |
| 10,308,992 B2 | 6/2019 | Chauvin |
| 10,373,084 B2 | 8/2019 | Kurjanowicz |
| 10,373,090 B2 | 8/2019 | Holm |
| 10,382,501 B2 | 8/2019 | Malatesha |
| 10,455,011 B2 | 10/2019 | Kendall |
| 10,496,943 B2 | 12/2019 | De |
| 10,594,788 B2 | 3/2020 | Larabie-Belanger |
| 10,606,859 B2 | 3/2020 | Smith |
| 10,613,735 B2 | 4/2020 | Karpe |
| 10,671,692 B2 | 6/2020 | Koopman |
| 10,684,870 B1 | 6/2020 | Sabo |
| 10,706,484 B1 | 7/2020 | Murnock |
| 10,785,046 B1 | 9/2020 | Raghavan |
| 10,810,222 B2 | 10/2020 | Koch |
| 10,846,105 B2 | 11/2020 | Granot |
| 10,846,297 B2 | 11/2020 | Smith |
| 10,922,104 B2 | 2/2021 | Sabo |
| 11,140,174 B2 | 10/2021 | Patel |
| 11,204,683 B1 | 12/2021 | Sabo |
| 2002/0065798 A1 | 5/2002 | Bostleman |
| 2002/0082889 A1 | 6/2002 | Oliver |
| 2002/0143594 A1 | 10/2002 | Kroeger |
| 2003/0028595 A1 | 2/2003 | Vogt |
| 2003/0036934 A1 | 2/2003 | Ouchi |
| 2003/0041317 A1 | 2/2003 | Sokolov |
| 2003/0097410 A1 | 5/2003 | Atkins |
| 2003/0126001 A1 | 7/2003 | Northcutt |
| 2003/0225598 A1 | 12/2003 | Yu |
| 2003/0233265 A1 | 12/2003 | Lee |
| 2003/0233268 A1 | 12/2003 | Taqbeem |
| 2004/0083448 A1 | 4/2004 | Schulz |
| 2004/0093290 A1 | 5/2004 | Doss |
| 2004/0093351 A1 | 5/2004 | Lee |
| 2004/0098291 A1 | 5/2004 | Newburn |
| 2004/0125150 A1 | 7/2004 | Adcock |
| 2004/0187089 A1 | 9/2004 | Schulz |
| 2004/0207249 A1 | 10/2004 | Baumgartner |
| 2004/0230447 A1 | 11/2004 | Schwerin-Wenzel |
| 2005/0216111 A1 | 9/2005 | Ooshima |
| 2005/0222971 A1 | 10/2005 | Cary |
| 2006/0028917 A1* | 2/2006 | Wigginton ........... G04G 15/006 368/28 |
| 2006/0047454 A1 | 3/2006 | Tamaki |
| 2006/0085245 A1 | 4/2006 | Takatsuka |
| 2006/0095859 A1 | 5/2006 | Booking |
| 2006/0136441 A1 | 6/2006 | Fujisaki |
| 2006/0167736 A1 | 7/2006 | Weiss |
| 2006/0190391 A1 | 8/2006 | Cullen |
| 2006/0200264 A1 | 9/2006 | Kodama |
| 2006/0218551 A1 | 9/2006 | Berstis |
| 2006/0224430 A1 | 10/2006 | Butt |
| 2006/0277487 A1 | 12/2006 | Poulsen |
| 2007/0016646 A1 | 1/2007 | Tendjoukian |
| 2007/0025567 A1 | 2/2007 | Fehr |

(56) References Cited

U.S. PATENT DOCUMENTS

| | | |
|---|---|---|
| 2007/0038494 A1 | 2/2007 | Kreitzberg |
| 2007/0041542 A1 | 2/2007 | Schramm |
| 2007/0050225 A1 | 3/2007 | Leslie |
| 2007/0073575 A1 | 3/2007 | Yomogida |
| 2007/0143169 A1 | 6/2007 | Grant |
| 2007/0147178 A1* | 6/2007 | Masuda ............... G06F 3/0481 368/29 |
| 2007/0150327 A1 | 6/2007 | Dromgold |
| 2007/0232278 A1 | 10/2007 | May |
| 2007/0255674 A1 | 11/2007 | Mahoney |
| 2007/0255715 A1 | 11/2007 | Li |
| 2007/0260499 A1 | 11/2007 | Greef |
| 2007/0288283 A1 | 12/2007 | Fitzpatrick |
| 2007/0294344 A1 | 12/2007 | Mohan |
| 2008/0033777 A1 | 2/2008 | Shukoor |
| 2008/0046471 A1 | 2/2008 | Moore |
| 2008/0079730 A1 | 4/2008 | Zhang |
| 2008/0082389 A1 | 4/2008 | Gura |
| 2008/0082956 A1 | 4/2008 | Gura |
| 2008/0120129 A1 | 5/2008 | Seubert |
| 2008/0126930 A1* | 5/2008 | Scott ............... G06Q 10/109 715/702 |
| 2008/0134069 A1 | 6/2008 | Horvitz |
| 2008/0155547 A1 | 6/2008 | Weber |
| 2008/0158023 A1 | 7/2008 | Chung |
| 2008/0167937 A1 | 7/2008 | Coughlin |
| 2008/0175104 A1 | 7/2008 | Grieb |
| 2008/0195964 A1 | 8/2008 | Randell |
| 2008/0221946 A1 | 9/2008 | Balon |
| 2008/0222566 A1 | 9/2008 | Daughtrey |
| 2008/0268876 A1 | 10/2008 | Gelfand |
| 2008/0270198 A1 | 10/2008 | Graves |
| 2008/0281665 A1 | 11/2008 | Opaluch |
| 2008/0313004 A1 | 12/2008 | Ryan |
| 2009/0048986 A1 | 2/2009 | Anderson |
| 2009/0055796 A1 | 2/2009 | Springborn |
| 2009/0076878 A1 | 3/2009 | Woerner |
| 2009/0089133 A1 | 4/2009 | Johnson |
| 2009/0094623 A1 | 4/2009 | Chakra |
| 2009/0113310 A1 | 4/2009 | Appleyard |
| 2009/0133027 A1 | 5/2009 | Gunning |
| 2009/0167553 A1 | 7/2009 | Hong |
| 2009/0187454 A1 | 7/2009 | Khasin |
| 2009/0199192 A1 | 8/2009 | Laithwaite |
| 2009/0204463 A1 | 8/2009 | Burnett |
| 2009/0204471 A1 | 8/2009 | Elenbaas |
| 2009/0234699 A1 | 9/2009 | Steinglass |
| 2009/0241053 A1 | 9/2009 | Augustine |
| 2009/0260010 A1 | 10/2009 | Burkhart |
| 2009/0287523 A1 | 11/2009 | Lau |
| 2009/0296908 A1 | 12/2009 | Lee |
| 2009/0299803 A1 | 12/2009 | Lakritz |
| 2010/0005087 A1 | 1/2010 | Basco |
| 2010/0070888 A1* | 3/2010 | Watabe ............... G06Q 50/188 715/760 |
| 2010/0088137 A1 | 4/2010 | Weiss |
| 2010/0106627 A1 | 4/2010 | O'Sullivan |
| 2010/0114786 A1 | 5/2010 | Aboujaoude |
| 2010/0115523 A1 | 5/2010 | Kuschel |
| 2010/0131860 A1 | 5/2010 | Dehaan |
| 2010/0145801 A1 | 6/2010 | Chekuri |
| 2010/0169146 A1 | 7/2010 | Hoyne |
| 2010/0169802 A1 | 7/2010 | Goldstein |
| 2010/0180212 A1 | 7/2010 | Gingras |
| 2010/0223575 A1 | 9/2010 | Leukart |
| 2010/0269049 A1 | 10/2010 | Fearon |
| 2010/0299171 A1 | 11/2010 | Lau |
| 2010/0312605 A1 | 12/2010 | Mitchell |
| 2010/0313151 A1 | 12/2010 | Wei |
| 2011/0015961 A1 | 1/2011 | Chan |
| 2011/0022662 A1 | 1/2011 | Barber-Mingo |
| 2011/0054968 A1 | 3/2011 | Galaviz |
| 2011/0055177 A1 | 3/2011 | Chakra |
| 2011/0071878 A1 | 3/2011 | Gingras |
| 2011/0071893 A1 | 3/2011 | Malhotra |
| 2011/0072372 A1 | 3/2011 | Fritzley |
| 2011/0093538 A1 | 4/2011 | Weir |
| 2011/0093619 A1 | 4/2011 | Nelson |
| 2011/0113365 A1 | 5/2011 | Kimmerly |
| 2011/0154216 A1 | 6/2011 | Aritsuka |
| 2011/0161128 A1 | 6/2011 | Barney |
| 2011/0184768 A1 | 7/2011 | Norton |
| 2011/0270644 A1 | 11/2011 | Roncolato |
| 2011/0307100 A1 | 12/2011 | Schmidtke |
| 2011/0307772 A1 | 12/2011 | Lloyd |
| 2012/0030194 A1 | 2/2012 | Jain |
| 2012/0035942 A1 | 2/2012 | Graupner |
| 2012/0066030 A1 | 3/2012 | Limpert |
| 2012/0066411 A1 | 3/2012 | Jeide |
| 2012/0072251 A1 | 3/2012 | Mircean |
| 2012/0079449 A1 | 3/2012 | Sanderson |
| 2012/0110087 A1 | 5/2012 | Culver |
| 2012/0117499 A1 | 5/2012 | Mori |
| 2012/0123835 A1 | 5/2012 | Chu |
| 2012/0131191 A1 | 5/2012 | May |
| 2012/0158946 A1 | 6/2012 | Shafiee |
| 2012/0192086 A1 | 7/2012 | Ghods |
| 2012/0221963 A1 | 8/2012 | Motoyama |
| 2012/0239451 A1 | 9/2012 | Caligor |
| 2012/0254218 A1 | 10/2012 | Ali |
| 2012/0266068 A1 | 10/2012 | Ryman |
| 2012/0278388 A1 | 11/2012 | Kleinbart |
| 2012/0296993 A1 | 11/2012 | Heyman |
| 2013/0007332 A1 | 1/2013 | Teh |
| 2013/0013560 A1 | 1/2013 | Goldberg |
| 2013/0014023 A1 | 1/2013 | Lee |
| 2013/0018688 A1 | 1/2013 | Nudd |
| 2013/0021629 A1 | 1/2013 | Kurilin |
| 2013/0066944 A1 | 3/2013 | Laredo |
| 2013/0067375 A1 | 3/2013 | Kim |
| 2013/0067549 A1 | 3/2013 | Caldwell |
| 2013/0073328 A1 | 3/2013 | Ehrler |
| 2013/0103412 A1 | 4/2013 | Nudd |
| 2013/0124638 A1 | 5/2013 | Barreto |
| 2013/0151421 A1 | 6/2013 | Van Der Ploeg |
| 2013/0151604 A1 | 6/2013 | Ranade |
| 2013/0173486 A1 | 7/2013 | Peters |
| 2013/0179208 A1 | 7/2013 | Chung |
| 2013/0179799 A1 | 7/2013 | Savage |
| 2013/0215116 A1 | 8/2013 | Siddique |
| 2013/0227007 A1 | 8/2013 | Savage |
| 2013/0246110 A1 | 9/2013 | Nakhayi Ashtiani |
| 2013/0246399 A1 | 9/2013 | Schneider |
| 2013/0279685 A1 | 10/2013 | Kohler |
| 2013/0317871 A1 | 11/2013 | Kulkarni |
| 2013/0339099 A1 | 12/2013 | Aidroos |
| 2013/0339831 A1 | 12/2013 | Gulanikar |
| 2014/0007005 A1 | 1/2014 | Libin |
| 2014/0012603 A1 | 1/2014 | Scanlon |
| 2014/0025767 A1 | 1/2014 | De Kezel |
| 2014/0036639 A1* | 2/2014 | Boni ............... G06Q 10/1093 368/29 |
| 2014/0040780 A1 | 2/2014 | Artzt |
| 2014/0040905 A1 | 2/2014 | Tadanobu |
| 2014/0058801 A1 | 2/2014 | Deodhar |
| 2014/0059910 A1 | 3/2014 | Norton |
| 2014/0074536 A1 | 3/2014 | Meushar |
| 2014/0089719 A1 | 3/2014 | Daum |
| 2014/0101310 A1 | 4/2014 | Savage |
| 2014/0156539 A1 | 6/2014 | Brunet |
| 2014/0165001 A1 | 6/2014 | Shapiro |
| 2014/0208325 A1 | 7/2014 | Chen |
| 2014/0215344 A1 | 7/2014 | Ligman |
| 2014/0229609 A1 | 8/2014 | Wong |
| 2014/0244334 A1 | 8/2014 | De |
| 2014/0257894 A1 | 9/2014 | Melahn |
| 2014/0279294 A1 | 9/2014 | Field-Darragh |
| 2014/0288987 A1 | 9/2014 | Liu |
| 2014/0310047 A1 | 10/2014 | De |
| 2014/0310051 A1 | 10/2014 | Meng |
| 2014/0350997 A1 | 11/2014 | Holm |
| 2014/0364987 A1 | 12/2014 | Shikano |
| 2015/0007058 A1 | 1/2015 | Wooten |
| 2015/0012330 A1 | 1/2015 | Sugiura |

(56) References Cited

U.S. PATENT DOCUMENTS

| | | |
|---|---|---|
| 2015/0052437 A1 | 2/2015 | Crawford |
| 2015/0058053 A1 | 2/2015 | De |
| 2015/0113540 A1 | 4/2015 | Rabinovici |
| 2015/0134393 A1 | 5/2015 | De |
| 2015/0153906 A1 | 6/2015 | Liao |
| 2015/0213411 A1 | 7/2015 | Swanson |
| 2015/0215256 A1 | 7/2015 | Ghafourifar |
| 2015/0262111 A1 | 9/2015 | Yu |
| 2015/0312375 A1 | 10/2015 | Valey |
| 2015/0317595 A1 | 11/2015 | De |
| 2015/0339006 A1 | 11/2015 | Chaland |
| 2015/0363733 A1 | 12/2015 | Brown |
| 2015/0379472 A1 | 12/2015 | Gilmour |
| 2016/0012368 A1 | 1/2016 | O'Connell |
| 2016/0048786 A1 | 2/2016 | Fukuda |
| 2016/0063192 A1 | 3/2016 | Johnson |
| 2016/0063449 A1 | 3/2016 | Duggan |
| 2016/0072750 A1 | 3/2016 | Kass |
| 2016/0110670 A1 | 4/2016 | Chatterjee |
| 2016/0124775 A1 | 5/2016 | Ashtiani |
| 2016/0140474 A1 | 5/2016 | Vekker |
| 2016/0140501 A1 | 5/2016 | Figlin |
| 2016/0147773 A1 | 5/2016 | Smith |
| 2016/0147846 A1 | 5/2016 | Smith |
| 2016/0148157 A1 | 5/2016 | Walia |
| 2016/0180277 A1 | 6/2016 | Skiba |
| 2016/0180298 A1 | 6/2016 | McClement |
| 2016/0182311 A1 | 6/2016 | Borna |
| 2016/0188145 A1 | 6/2016 | Vida |
| 2016/0224939 A1 | 8/2016 | Chen |
| 2016/0234391 A1 | 8/2016 | Wolthuis |
| 2016/0275436 A1 | 9/2016 | Kurjanowicz |
| 2016/0313934 A1 | 10/2016 | Isherwood |
| 2016/0328217 A1 | 11/2016 | Hagerty |
| 2016/0342927 A1 | 11/2016 | Reznik |
| 2017/0004213 A1 | 1/2017 | Cunico |
| 2017/0009387 A1 | 1/2017 | Ge |
| 2017/0017364 A1 | 1/2017 | Kekki |
| 2017/0017924 A1 | 1/2017 | Kashiwagi |
| 2017/0039503 A1 | 2/2017 | Jones |
| 2017/0061341 A1 | 3/2017 | Haas |
| 2017/0068933 A1 | 3/2017 | Norton |
| 2017/0093874 A1 | 3/2017 | Uthe |
| 2017/0099296 A1 | 4/2017 | Fisher |
| 2017/0103369 A1 | 4/2017 | Thompson |
| 2017/0116552 A1 | 4/2017 | Deodhar |
| 2017/0132200 A1 | 5/2017 | Noland |
| 2017/0153799 A1 | 6/2017 | Hoyer |
| 2017/0177671 A1 | 6/2017 | Allgaier |
| 2017/0185592 A1 | 6/2017 | Frei |
| 2017/0192642 A1 | 7/2017 | Fishman |
| 2017/0206217 A1 | 7/2017 | Deshpande |
| 2017/0249577 A1 | 8/2017 | Nishikawa |
| 2017/0316367 A1 | 11/2017 | Candito |
| 2017/0317898 A1 | 11/2017 | Candito |
| 2017/0323233 A1 | 11/2017 | Bencke |
| 2017/0323267 A1 | 11/2017 | Baek |
| 2017/0344754 A1 | 11/2017 | Kumar |
| 2018/0032524 A1 | 2/2018 | Byron |
| 2018/0052943 A1 | 2/2018 | Hui |
| 2018/0053127 A1 | 2/2018 | Boileau |
| 2018/0059910 A1 | 3/2018 | Wooten |
| 2018/0060785 A1 | 3/2018 | Carnevale |
| 2018/0060818 A1 | 3/2018 | Ishiyama |
| 2018/0063063 A1 | 3/2018 | Yan |
| 2018/0068271 A1 | 3/2018 | Abebe |
| 2018/0088754 A1 | 3/2018 | Psenka |
| 2018/0095938 A1 | 4/2018 | Monte |
| 2018/0131649 A1 | 5/2018 | Ma |
| 2018/0157477 A1 | 6/2018 | Johnson |
| 2018/0165610 A1 | 6/2018 | Dumant |
| 2018/0173386 A1 | 6/2018 | Adika |
| 2018/0225795 A1 | 8/2018 | Napoli |
| 2018/0247352 A1 | 8/2018 | Rogers |
| 2018/0260081 A1 | 9/2018 | Beaudoin |
| 2018/0262620 A1 | 9/2018 | Wolthuis |
| 2018/0285471 A1 | 10/2018 | Hao |
| 2018/0316636 A1 | 11/2018 | Kamat |
| 2018/0331842 A1 | 11/2018 | Faulkner |
| 2018/0357049 A1 | 12/2018 | Epstein |
| 2018/0373804 A1 | 12/2018 | Zhang |
| 2019/0005048 A1 | 1/2019 | Crivello |
| 2019/0034057 A1 | 1/2019 | Rudchenko |
| 2019/0068390 A1 | 2/2019 | Gross |
| 2019/0079909 A1 | 3/2019 | Purandare |
| 2019/0080289 A1 | 3/2019 | Kreitler |
| 2019/0095839 A1 | 3/2019 | Itabayashi |
| 2019/0095846 A1 | 3/2019 | Gupta |
| 2019/0102700 A1 | 4/2019 | Babu |
| 2019/0138961 A1 | 5/2019 | Santiago |
| 2019/0139004 A1 | 5/2019 | Vukovic |
| 2019/0147386 A1 | 5/2019 | Balakrishna |
| 2019/0187987 A1 | 6/2019 | Fauchère |
| 2019/0213509 A1 | 7/2019 | Burleson |
| 2019/0340296 A1 | 11/2019 | Cunico |
| 2019/0340574 A1 | 11/2019 | Ekambaram |
| 2019/0347094 A1 | 11/2019 | Sullivan |
| 2019/0370320 A1 | 12/2019 | Kalra |
| 2020/0019907 A1 | 1/2020 | Notani |
| 2020/0065736 A1 | 2/2020 | Relangi |
| 2020/0192538 A1 | 6/2020 | Karpe |
| 2020/0192908 A1 | 6/2020 | Smith |
| 2020/0218551 A1 | 7/2020 | Sabo |
| 2020/0328906 A1 | 10/2020 | Raghavan |
| 2020/0344253 A1 | 10/2020 | Kurup |
| 2021/0004381 A1 | 1/2021 | Smith |
| 2021/0110347 A1 | 4/2021 | Khalil |
| 2021/0232282 A1 | 7/2021 | Karpe |
| 2021/0342786 A1 | 11/2021 | Jiang |

OTHER PUBLICATIONS

"U.S. Appl. No. 14/584,750, Non Final Office Action dated Aug. 28, 2015", 21 pgs.
"U.S. Appl. No. 14/584,750, Notice of Allowance dated Mar. 28, 2016", 8 pgs.
"U.S. Appl. No. 14/584,750, Response filed Feb. 29, 2015 to Non Final Office Action ated Aug. 28, 2015", 16 pgs.
"U.S. Appl. No. 14/584,850, Final Office Action dated Sep. 1, 2017", 31 pgs.
"U.S. Appl. No. 14/584,850, Non Final Office Action dated Jan. 10, 2017", 9 pgs.
"U.S. Appl. No. 14/584,850, Response filed Apr. 10, 2017 to Non Final Office Action dated Jan. 10, 2017", 13 pgs.
"How to Asana: Inviting teammates to Asana." YouTube, Asana, Mar. 21, 2017, https://www.youtube.com/watch?v=TLOruY1KyxU (Year: 2017), 13 pages.
Asana Demo and Product Tour, you tube excerpt, Dec. 7, 2017 https://www.youtube.com/watch?v=IMAFWVLGFyw (Year: 2017) (16 pages).
Asana integrations, Asana tutorial, youtube, excerpt, Nov. 16, 2016 https://www.youtube.com/watch?v=hBiQ7DJNinE (Year: 2016) (21 pages).
Asana Workload and Portfolios,youtube,excerpt, Aug. 1, 2019 https://www.youtube.com/watch?v=7XkNcfFDG6M (Year: 2019) (20 pages).
Asana YouTube channel, list of all product videos, Nov. 19, 2014-Aug. 19, 2019 https://www.youtube.com/user/AsanaTeam/videos?disable_polymer=1 (Year: 2019) (5 pages).
Asana, Task dependencies, archives org, Aug. 25, 2017 https://web.archive.org/web/20170825002141/https://asana.com/guide/help/tasks/dependencies (Year: 2017) (5 pages).
Asana,Manage your team capacity with Workload, youtube, excerpt, Aug. 1, 2019 https://wwv/.youtube.com/watch?v=2ufXyZDzZnA &list=PLJFG93oi0wJAi UwyOhlGWHdtJzJrzylBv (Year: 2019) (1 page).
Biggs, "GateGuru Relaunches With New Ways to Streamline Your Travel Experience", Techcrunch, (Apr. 26, 2013), 3 pgs.
Castaneda Samuel, Introduction Manual—Asana, Sep. 25, 2017 https://static1.squarespace.com/static/586d532ae58c6232db243a65/t/5c210c10f950b7fc7a8e3274/1545669658049/Asana+Manual.pdf (Year: 2017) (20 pages).

(56) References Cited

OTHER PUBLICATIONS

Command and control, Wikipedia, archives org, Mar. 16, 2018 https://web.archive.org/web/20180316193655/https://en.wikipedia.org/wiki/Command_and_control (Year: 2018), 6 pages.
How to Asana Asana time tracking, youtube, excerpt, May 24, 2017 https://www.youtube.com/watch?v=z91qlex-TLc (Year: 2017) (1 page).
How to Asana, Asana project management, youtube, excerpt, Mar. 7, 2017 https://www.youtube.com/watch?v=qqANMTvVpE (Year: 2017) (28 pages).
How to Asana, Creating your first Asana project, youtube, excerpt, Jan. 31, 2017 https://www.youtube.com/watch?v=L04WmcUdsLo (Year: 2017) (1 page).
How to Asana, Getting Asana into your workflow, youtube, excerpt, Jul. 17, 2017 https://www.youtube.com/watch?v=7YLrNMdv3o (Year: 2017) (24 pages).
How to Asana, Planning with Asana calendar, youtube excerpt, Feb. 14, 2017 https://www.youtube.com/watch?v=w8t6KYiVPyc (Year: 2017) (19 pages).
How to Asana, Using Asana for task management, youtube, excerpt, Feb. 7, 2017 https://www.youtube.com/watch?v=vwvbgiejhQ (Year: 2017) (8 pages).
How to Asana, Visualizing work with Asana kanban boards, youtube, excerpt, Feb. 21, 2017 https://www.youtube.com/watch?v=jmZaZGydfPY (Year: 2017) (41 pages).
How to Asana, Workflow management, youtube, excerpt, May 30, 2017 https://www.youtube.com/watch?v=rk8nPWmXsRo (Year: 2017) (9 pages).
How to use Advanced Search in Asana, Asana tutorial, May 25, 2016 https://www.youtube.com/watch?v=5VyJ3toPfQM (Year: 2016) (28 pages).
Justin Rosenstein, Unveiling the Future of Asana, Mar. 28, 2018 https://www.youtube.com/watch?v=nRI?d_WM4Bc (Year: 2018) (2 pages).
Prioritize My Tasks in Asana, Asana tutorial, youtube, excerpt, May 25, 2016 https://www.youtube.com/watch?v=UbCnMvw01nl (Year: 2016) (3 pages).
Project views, Asana tutorial, youtube, excerpt May 25, 2016 https://www.youtube.com/watch?v=FYjA8ZH3ceQ (Year: 2016) (5 pages).
Using Asana Premium, Asana tutorial, youtube, excerpt, Sep. 10, 2016 https://www.youtube.com/watch?v=vMgLtDDmyeo (Year: 2016) (4 pages).
Where does Asana fit in, archives org, Jul. 8, 2017 https://web.archive.org/web/20170708150928/https://asana.com/guide/resources/infosheets/where-does-asana-fit (Year: 2017) (5 pages).
www.cogmotive.com/blog/author/alan Alan Byrne: "Creating a company Shared Calendar in Office 365"; pp. 1-17; Sep. 10, 2013.
Hartmann, "TimeProjectscheduling with resource capacities and requests varying with time: a case study," 2013, Flexible services and manufacturing journal, vol. 25, No. 1, pp. 74-93 (Year: 2013).
Paul Minors, How to automate your tasks, youtube excerpts, Oct. 18, 2019 https://www.youtube.com/watch?v=lwF9XyUQrzw (Year: 2019).
Mauricio Aizawa, Zapier, How to Automate Asana Tasks creation using Evernote, youtube excerpts, Mar. 16, 2018 https://www.youtube.com/watch?v=BjDQ4Gny4WI (Year: 2018).
Critical chain project management, Wkipedia, archives org, Dec. 17, 2016 https://web.archive.Org/web/20161217090326/https://en.wikipedia.org/wiki/Critical_chain_project_management (Year: 2016) 5 pages.
Critical Path Method, Wikipedia, archives org, Sep. 19, 2017 https://web.archive.Org/web/20170919223814/https://en.wikipedia.org/wiki/Critical_path_method (Year: 2017) 6 pages.
Fruhlinger, Joshua. "The Best To-Do ListApps for Feeling Productive; With the right app, feeling productive can be just as gratifying as actually getting things done" Wall Street Journal (Online); New York, N.Y. [New York, N.Y]Nov. 8, 2013 (Year: 2013) 4 pages.
www.asana.com (as retrieved from https://web.archive.Org/web/20160101054536/https://asana.com/press and https://web.archive.org/web/20160101054527/https://asana.com/product) (Year: 2016) 15 pages.
Asset, F., Cassius, T. S., & Maria, T. S. (2018). Confrontation between techniques of time measurement. Journal of Manufacturing Technology Management, 29(5), 789-810. (Year: 2018).
(Tiburca, Andrew) Best Team Calendar Applications for 2018—Toggl https://toggl.com/blog/best-team-calendar-applications-for-2018 (Year: 2017).
Macro, computer science, Wikipedia, archives org Feb. 11, 2020 http://web.archive.org/web/20200211082902/https://en.wikipedia.org/wiki/Macro_(computer_science) (Year: 2020).
Lauren Labrecque, "Fostering Consumer-Brand Relationships in Social Media Environments: The Role of Parasocial Interaction", 2014, Journal of Interactive Markeing, 28 (2014), pp. 134-148 (Year: 2014).

\* cited by examiner

Calendar for Projects
         🔍 Search                    ⌄
         Find Tasks                                              ✕
810 — 🔍  Contains the words
812 — 👤  Assigned to
814 — 📋  In projects
816 — 🏷  Tagged with           220
818 — 📎  [Attachments Only] [Any]   ☑ [Completed] [Incomplete] [Any]
822 — 📅  [Due Within the Next ⌄] [    ] [Days]
824 — 👥  In Teams   [The Team]
826 — ➕  Search by Another Field ⌄

[Search]   USEFUL SEARCHES
                    📡 Tasks I'm Following  ⚡Tasks I Created  👤→ Tasks I Assigned
                    👤 Unassociated Tasks  👤✕ Unassigned Tasks

*FIG. 6*

| Attribute | Description |
|---|---|
| Task name | Entered through dialog box Figures 2-4 |
| Task creator | Automatically set to creator |
| TaskNum_hearts; | Incremented when user clicks heart icon |
| Task schedule status; | Set by task assignee |
| Task user_visible_modification_time; | |
| Task creation time; | Automatically set to time of creation |
| Task modification_time; | Update when any attribute changed |
| Trashed_at time; | |
| Task trashed_by; | |
| Task completed time; | Set when user completes task |
| Task due date; | Entered through dialog box Figures 2-4 |
| Task type; | |
| Task force_public_to_workspace; | Set by user |
| Task description; | Entered through dialog box Figures 2-4 |
| Task permanently_trashed_info; | |
| Task comments (text of all comments concatenated); | Set by other users |
| Task num_comments; | Increments when comments added |
| Task assigner_ids; | Set when person assigns task to another |
| Task commenter_ids; | Set when a user adds a comment |
| Task attachment_ids; | |
| Task attachment_types; | |
| Task attachment_names; | Set when user uploads an attachment |
| Task follower_ids; | Set when follower follows a task |
| Task hearter_ids; | |
| Task tag_ids; | |
| Task project_ids; | |
| Task assignee_ids; | |
| Task has_subtasks | |
| (WHERE IS THERE A "project attribute" THAT INDICATES THE PROJECT(S) THAT THE TASK BELONGS TO?) | |

*FIG. 8*

| Date | July 22, 2014 |
| --- | --- |
| Code Object Identifier | ID for Approval for Budget |

*FIG. 13*

★ Tasks in Weekly Marketing Meeting Agenda, Marketing & Sales Materials, or Goals Q2 2014 — 1404

☰ List  📅 Calendar  ≡ Sort ▾  — 1402

| # | | Task | Project | Date | |
|---|---|---|---|---|---|
| 1 | › | | Send August Newsletter | Weekly Marke... | Aug 28, 2013 ♥2 |
| 2 | › | | Review Forecast for Q3 | Weekly Marke... | Oct 2, 2013 ♥1 |
| 3 | › | 🗓 | [10 mins] Weekly Metrics Review | Weekly Marke... | Marketing ▾ | Dec 12, 2013 |
| 4 | › | 🗓 | [10mins] Regular Review of Goals | Weekly Marke... | Dec 12, 2013 |
| 5 | › | 🗓 | [5mins] Review incomplete Tasks in Q4 Marketing | Weekly Marke... | Dec 20, 2013 |
| 6 | › | 🗓 | [10mins] Regular Review of Goals | Weekly Marke... | Dec 26, 2013 |
| 7 | › | 🗓 | [10mins] Regular Review of Goals | Weekly Marke... | Asana use ca... | Dec 30, 2013 |
| 8 | › | | Multi-homing | Weekly Marke... | Marketing ▾ | Dec 31, 2013 |
| 9 | › | | Budget | Goals Q2 2014 | Dec 31, 2013 |
| 10 | › | JK | Run 4 campaigns that result in at least 15% increase inbound interest | Goals Q2 2014 | Dec 31, 2013 |
| 11 | › | 🖼 | Implement newly designed rocket communication system | Weekly Marke... | Jan 7 |
| 12 | › | 👥 | Get more partners for launch | Weekly Marke... | Jan 14 |
| 13 | › | | [10min] discuss budget for campaign | Launch iPad ... | Goals Q2 2014 | ... | Jan 19 ♥1 |
| 14 | › | | ** Build radio feature by EOD | Weekly Marke... | Jan 21 |
| 15 | › | 🗓 | [10mins] Regular Review of Goals | Weekly Marke... | P1 | Jan 28 |
| 16 | › | 🗓 | [.5IED] Create Project for Quarterly Goals | Weekly Marke... | Jan 28 |
| 17 | › | 🗓 | [10min] Regular Review of Goals | Weekly Marke... | Jan 28 |
| 18 | › | 🗓 | [10mins] Regular Review of Goals | Weekly Marke... | Jan 29 |
| 19 | › | 🗓 | [10mins] Regular Review of Goals | Weekly Marke... | Jan 29 |
| 20 | › | 🗓 | Projects and Tasks | Weekly Marke... | January 29, ... | Jan 29 |

FIG. 14

CONTINUOUSLY SCROLLABLE CALENDAR USER INTERFACE

BACKGROUND

Electronic calendars typically display calendar entries based upon individual predetermined lists of events, such as a calendar for a single person, single room, or single project. While some prior calendars allow overlaying of multiple lists on the same view, they generally have limited capability to enable dynamic combinations and selection of entries across multiple lists. While calendars have been employed routinely to plan and organize activities, they generally have not been used for dynamic communication and dynamic information sharing. There is a need for an electronic calendar system that facilitates dynamic communication and dynamic information sharing to thereby facilitate collaboration and the organization, management of people and projects.

SUMMARY

In one aspect, a method is provided to display a calendar user interface (UI). A visible range of a calendar UI is displayed on a device display screen. The calendar UI includes a display grid that includes individual date panes that are associated with individual dates, wherein the date panes are arranged in rows corresponding to weeks and columns corresponding to days of the week and wherein the visible range of the calendar UI includes multiple rows of date panes. The displayed grid includes a gradual change in display screen background shading that starts and ends with a date display pane that corresponds to a prescribed day of the month.

BRIEF DESCRIPTION OF THE DRAWINGS

FIG. 1C is an illustrative drawing of the calendar user interface (UI) instance of FIG. 1B showing a week expanded in accordance with some embodiments.

FIG. 6 is an illustrative drawing of an example second user interface screen display to receive user input to specify a search query to define a new calendar UI instance in accordance with some embodiments.

FIG. 8 is an illustrative drawing of a table that identifies multiple different kinds of example task attributes and provides brief descriptions of some of them in accordance with some embodiments.

FIG. 13 is an illustrative drawing that represents an example date pane information structure in accordance with some embodiments.

FIG. 14 is an illustrative drawing of a list UI instance that corresponds to the calendar UI instance of FIG. 1 in accordance with some embodiments.

DESCRIPTION OF EMBODIMENTS

Figure 1A:
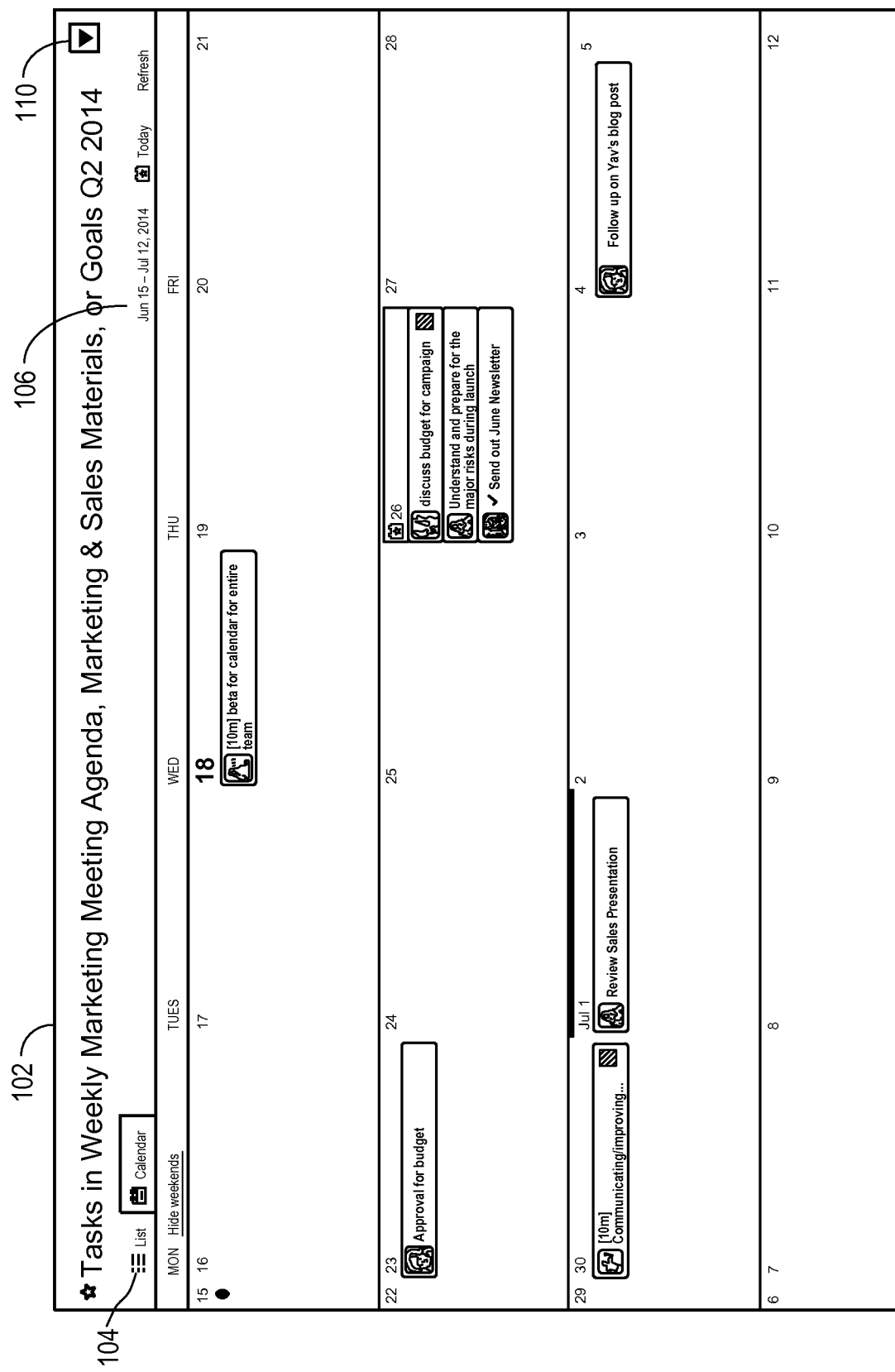
FIG. 1A is an illustrative drawing of a calendar user interface (UI) instance showing Saturday and Sunday date panes collapsed in in accordance with some embodiments.

The following description is presented to enable any person skilled in the art to create and use a computer system configuration and related method and article of manufacture to produce and use a calendar user interface in accordance with some embodiments. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention can be practiced without the use of these specific details. In other instances, well-known data structures and processes are shown in block diagram form in order not to obscure the description of the invention with unnecessary detail. Identical reference numerals may be used to represent different views of the same item in different drawings. Flow diagrams in drawings referenced below are used to represent processes. One or more computer systems are configured to perform these processes. The flow diagrams include modules that represent the configuration of a computer system according to computer program code to perform the acts described with reference to these modules. Thus, the present invention is not intended to be limited to the embodiments shown, but is to be accorded the widest scope consistent with the principles and features disclosed herein.

Definitions

As used herein a "visual content item" refers to an object that is visible within a date pane of a calendar date pane display grid produced on a display screen and that may have associated visible information content such as text and graphics, for example. A visual content item may include user interface controls such as buttons and menus for use in display, editing and searching, for example. A visual content object typically is associated with one or more searchable attributes, such as text that it may contain or entries in information fields that it may contain, for example.

As used herein a "code object" refers to electronic device readable code that corresponds to a visual content item and that is used by an electronic device to generate the corresponding visual content item. A code object typically is associated with one or more searchable attributes, that in turn, correspond to attributes of its corresponding visual content item, for example.

Calendar User Interface

FIG. 1A is an illustrative drawing of a calendar user interface (UI) instance 102 in accordance with some embodiments. A date pane field includes a two dimensional display grid of date panes that correspond to days and weeks of the month. As used herein a "date pane" refers to a physical region of a calendar UI display associated with a single date. The region typically is rectangular in shape. A date pane typically includes an indication of the day of the month or week that it represents. For example, a date pane containing the number 22 may indicate that it corresponds to the 22$^{nd}$ day of the month. Visual content items displayed with date panes provide information such as task identification, identification of persons responsible for tasks and status of tasks. Different users provide calendar entry information that is stored for use to produce different visual content items.

A scrollable display grid template within the calendar UI includes columns and rows of date panes. Each date pane corresponds to a different day of the month, which is indicated in the top left corner of each pane. Each column of date panes corresponds to a day of the week, which is listed above the top row of the display grid template, i.e. Mon, Tues, etc. Each row of date panes corresponds to seven days of a week. Each row begins with Sunday and ends with a Saturday. In the example view of the calendar UI instance in FIG. 1A, all of the date panes corresponding to Sundays and Saturdays are collapsed so as to show only the day of the month of each Sunday and each Saturday. In other words, illustrative FIG. 1A calendar UI includes full expanded views of panes, which hide visual content items displayed within them for each of Monday-Friday, and has collapsed views of panes, which hide visual content items displayed within them for Sunday and Saturday. The date panes for Sunday and Saturday are collapsed to make more screen space available for display of visual content items within the days of the typical work week. The collapsed date panes may include indicia to indicate that a visual content item is associated with the date pane. For example, in some embodiments a collapsed date pane includes a dot to indicate that a visual content item is associated with the collapsed date pane. In FIG. 1A, the collapsed pane corresponding to Sunday the 15$^{th}$ of the month includes a dot 108 that acts as an indicator that the pane when in expanded form includes one or more visual content items. In the collapsed form shown in FIG. 1A, those visual content items are hidden, but the dot 108 indicates their existence. It will be appreciated that when a date pane is collapsed, there is insufficient space to show its associated visual content item.

Figure 1B:
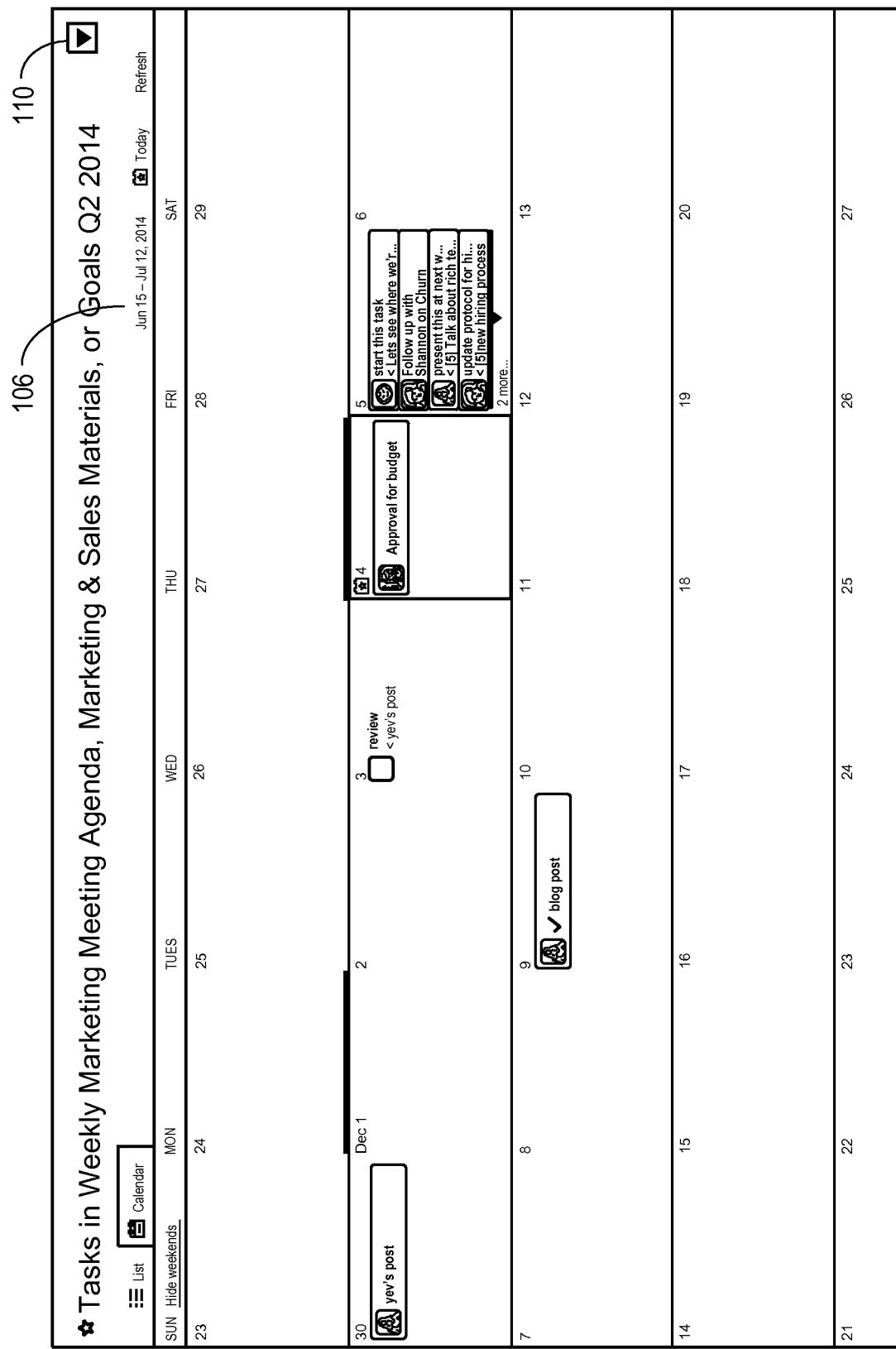
FIG. 1B is an illustrative drawing of another calendar user interface (UI) instance showing Saturday and Sunday date panes expanded in accordance with some embodiments.

In the example view of the calendar UI instance in FIG. 1B is an illustrative drawing of a different calendar UI instance with date panes corresponding to Sundays and Saturdays displayed in expanded form so as to show content information items associated with the Saturday and Sunday date panes. The date pane for Saturday the 30$^{th}$ displays a content item labeled "yev's post". Comparing FIG. 1A and FIG. 1B, which display different calendar instances, it can be seen that with the Saturday and Sunday date panes open, the size of the Monday through Friday date panes is reduced leaving reduced space for the display of associated visual content items. Referring to the calendar UI instance of FIG. 1B, the date pane for Thursday the 4$^{th}$ of the month, contains a list of content items ends with an indicator "2 more . . . " indicating that there are additional visual display items associated with that date pane. In accordance with some embodiments, the column of date panes for Sunday and Saturday can be selectively collapsed and expanded through user input such as pointing and clicking, for example.

The number of weeks displayed in a calendar UI can be adjusted depending upon how many weeks will fit in the height of a browser window (not shown) or other screen display area used by a device displaying the Calendar UI. The illustrative calendar UI displays four weeks. Different browser windows and different devices may have different display region dimensions such as different heights and widths. Thus in some end-user devices, the number of weeks displayed within a calendar UI depends upon available device display area.

The current day of the month is indicated by a current date marker, which in some embodiments includes star symbol. In the illustrative calendar UI instance of FIG. 1A, the current date is the 26$^{th}$ of the month and the date pane representing the 26$^{th}$ contains a star. In the illustrative calendar UI instance of FIGS. 1B-1C, the current date is the 4$^{th}$ of the month and the date pane representing the 4$^{th}$ contains a star. A date pane representing the first day of a month includes a new month marker, which in some embodiments includes a heavy horizontal line adjacent to an indication of the month. In the illustrative example calendar UI instance of FIG. 1A, the date pane representing the numerical 1$^{st}$ day of the month, which happens to fall on a Tuesday, includes a heavy horizontal line across its top portion and the indication "Jul 1" adjacent to the horizontal line. Similarly, in the illustrative example calendar UI instance of FIGS. 1B-1C, the date pane representing the numerical day of the 1$^{st}$ day of the falls on a Monday and includes a heavy horizontal line across its top portion and the indication "Dec 1" adjacent to the horizontal line. Note that in accordance with some embodiments, the date pane representing the first day of the month indicates the month, e.g., "Jul" or "Dec", within the pane itself, but other panes do not include a month indicator. In the illustrative embodiment, a calendar view date range indication, which indicates the range of dates currently visible on screen within the calendar UI, is displayed across the top of the calendar UI. In the illustrative calendar UI of FIG. 1A, the calendar view range indicates, "Jun 15-Jul 12, 2014", and in the illustrative calendar UI of FIGS. 1B-1C, the calendar view range indicates, "Nov 23-Dec 27, 2014" The calendar view range indication changes automatically with changes in the range of dates represented in the calendar UI.

Shading of date panes demarcates changes from one month to the next. More specifically, background shading of date panes gradually changes between the first and last day of the month. In accordance with some embodiments, the first day of the months is the least shaded, i.e. has the lightest background shading, and the last day of the month has the greatest shading, i.e. has the darkest background shading. More specifically, in accordance with some embodiments, each successive day of the month becomes progressively darker starting with white on the first day of a month and changing to the darkest shading on the last day on the month. In other words, panes corresponding to days between the first and last days of the month become progressively darker the farther they are from the first day of the month and the closer they are to the last day of the month. This shading pattern recurs for each month. In some embodiments, the shading level varies linearly from one day of the month to the next. For example, assuming that a lightest shading level is represented by the number 1 and that a darkest shading level is represented by the number 31, the first day of the month has shading level 1, the second day of the month has a slightly darker shading level 2, the third day of the month has shading level 3, etc. Thus, a user is alerted to a transition from one month to the next, not only by the new month marker and the month indicator on the first day of the month, but also by a sharp transition in shading between the darkest background last day of a previous month and the lightest background first day of a next month. Alternatively, the shading pattern can be reversed with the first day of the month being the most heavily shaded and the last day of the month being the least heavily shaded.

A lightweight feel to the calendar UI instances is achieved at least in part through the use of lightly shaded horizontal lines to provide a visible demarcation between rows and through an absence of vertical lines between columns of date panes. As with a conventional calendar, the panes in each vertical column correspond to the same day of the week for the month, and the panes in each horizontal row correspond to days of one week of the month. A demarcation between vertical column boundaries is provided by a numerical indication of the day of the month in the upper left side of each pane. Individual panes also may include content information. The use of lightly shaded horizontal lines and the absence of vertical lines limit distraction from content information displayed within panes of the calendar UI and can have the effect of making the content stand out more prominently.

The calendar UI instances include a search query input field disposed above the date pane display grid in the illustrative calendar UI instance in which a user can enter a search query used to identify visual content items displayed within date panes of the calendar UI. The search query specifies search terms selected by the user for use to search for matching visual content items to be displayed within the date panes of the calendar UI instance. A calendar instance is defined using the search query field content. More specifically, a search query determines visual content information included within date panes of the calendar UI instance and thereby defines the calendar UI instance. As explained below, a calendar UI instance is defined through a search for visual content items that match the search query within the calendar UI instance search query field that are then displayed within date panes of the calendar UI instance to define the calendar UI instance. The visual content items may have been created by the user who enters the search query or by other users. Thus, a search query may result in display within a calendar UI instance of visual content items created by different users. The calendar UI instance of FIG. 1A includes the illustrative example search query, "Tasks in Weekly Marketing Meeting Agenda, Marketing & Sales Material, or Goals Q2 2014" shown displayed within the search field. The example visual content items displayed within the illustrative calendar UI instance of FIG. 1A were selected in response to the illustrative query in that calendar UI instance. The calendar UI instance of FIGS. 1B-1C includes the illustrative example search query, "Items in Weekly Marketing Meeting Agenda, Marketing & Sales Material, or Company Goals/KRs" shown displayed within the search field. The example visual content items displayed within the illustrative calendar UI instance of FIGS. 1B-1C were selected in response to the illustrative query in that calendar UI instance.

The user who defines the search query also may specify which other users should have access to a calendar UI generated using the search query. Users who are given access to the resulting calendar UI may have it delivered automatically to their devices or alternatively, may be required to request it or download it, for example. Thus, a calendar UI defined by an (or more) individual is shared with multiple users for planning, communication and collaboration.

A date selection field indicates a date range currently displayed within the calendar UI date pane display grid. In the example calendar UI instance of FIG. 1A, for example, the date range is "Jun 15-Jul 12, 2014". A user may enter a date range in the date selection field 106 to select a date range to be displayed within the display grid. In accordance with some embodiments, in the absence of user input to the date selection field, the calendar UI defaults to use the current date as a reference date to determine the date range to display within the calendar display grid. User input of a new date range in the date selection field results in a calendar UI jump to the new date range and to display of calendar UI items associated with dates in the new date range. The illustrative calendar UI instance displays multiple visual content items. As explained more fully below, visual content items are generated using corresponding code objects stored in a non-transitory computer readable storage device. User entries from different users can define different code objects, which in turn, can be used to generate different visual content items. The visual content items visible within the date panes of a given calendar UI instance are determined based upon a user-provided search query that defines the given calendar UI instance.

Date pane size can be varied in accordance with some embodiments. Visual content items are displayed within date panes. However, there may be more visual content items associated with a given date pane than can be displayed within a normal size date pane. In accordance with some embodiments, date pane size can be selectively expanded to display a greater number of visual content items than a number that can be displayed when the date pane is normally sized. In accordance with some embodiments, an entire row of date panes is expanded or compacted in unison. Expanding an entire row, which represents a week, advantageously provides a user with visual content item detail for multiple days and not just a single one facilitating visualization of tasks on a crowded calendar. Moreover, during normal operation, weekend date panes are compacted so that none of their associated visual content items are visible during normal operation. However, in response to a user request, weekend date panes can be expanded to display their associated visual content items. When weekend date panes are expanded, corresponding weekday date panes are correspondingly compacted to make room for them within the calendar UI.

Figure 4:
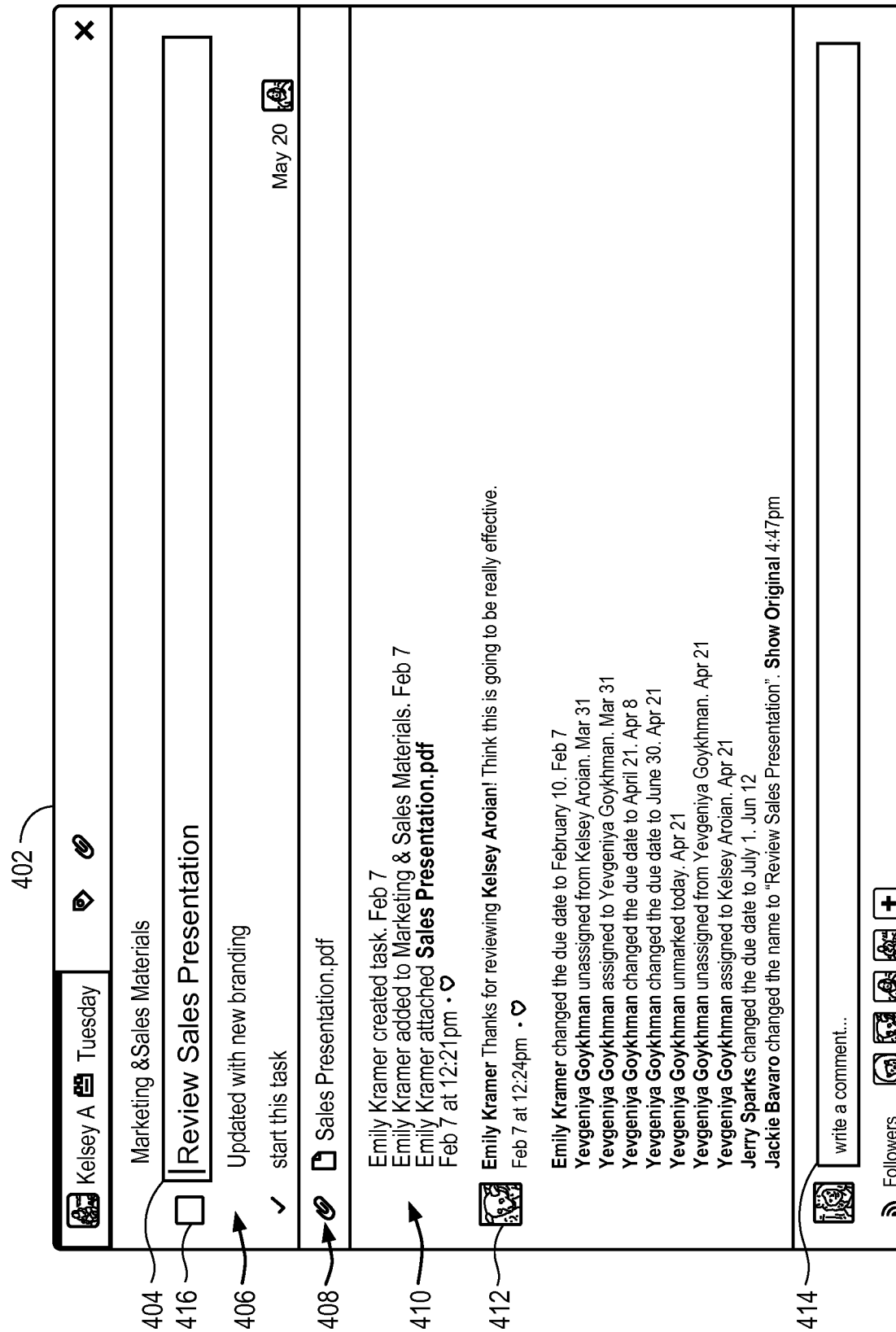
FIG. 4 is an illustrative drawing of an example expanded view of a visual content item in accordance with some embodiments.

A visual content item may include multiple different pieces of information. A visual content item may represent an activity. An item that represents an activity may display a label naming the activity, status (e.g., completed, overdue), relatedness to other items (e.g., via color), and other information. FIG. 4, which is explained more fully below is an illustrative drawing showing the visual UI item from "Jul 1" in the calendar UI instance of FIG. 1A. In accordance with some embodiments, the visual content items within date panes can be selectively collapsed and expanded through user input such as pointing and clicking, for example.

Figure 1C:
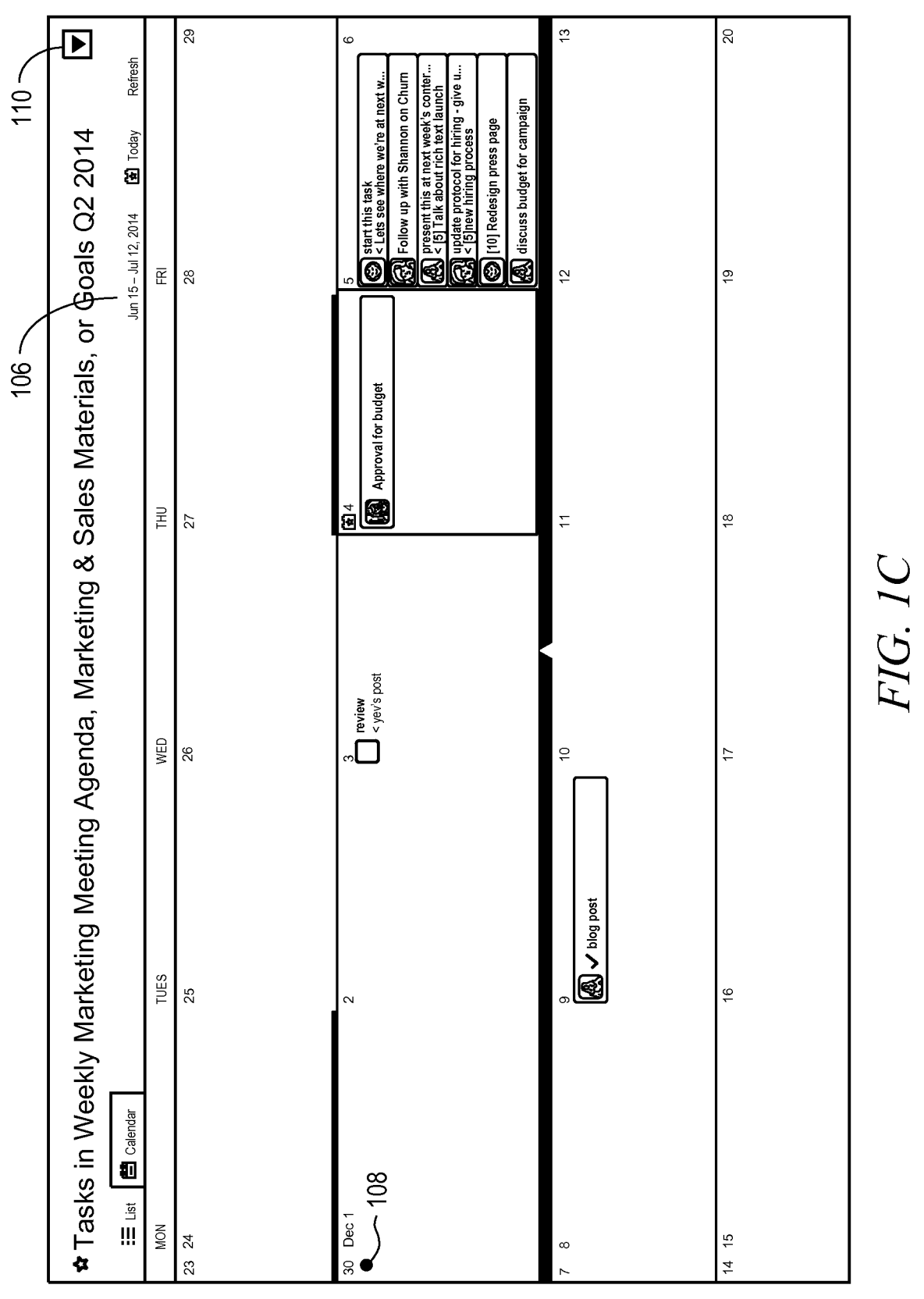

The date panes of the calendar UI weeks are expandable so as to increase the amount of information displayed by visual content display items within an expanded week. FIG. 1C is an illustrative drawing showing the week Nov 30 to Dec 6 in FIGS. 1B-1C in expanded form. In FIG. 1C, the weekend date panes are shown in compacted, unexpanded form. Note that the date pane for the 30$^{th}$ includes a dot 108, which indicates content of that date pane that is not visible in the compacted form. Recall that the content of the 30$^{th}$, "yev's post" is displayed in the expanded from shown in FIG. 1B. A date pane that is associated with multiple visual display items may have insufficient space to display all of its associated items when not expanded. Note that in FIG. 1B, the date pane representing the 6$^{th}$ in unexpanded form has the notation, "2 more . . . ", indicating that the date pane includes two more visual continent items that are not currently visible. In FIG. 1C, the date pane representing the 6$^{th}$ in expanded form shows those "two more" visual content items. By expanding the week in which the date pane is disposed, items become visible that were hidden (not visible) when the week was not expanded. In accordance with some embodiments, the height of a row (i.e. a week) in expanded form depends upon the number of visual content items to be displayed. Thus, for example, if the date pane representing the 6$^{th}$ included more visual content items and not just "2 more", then it would be even wider in its expanded from.

Visual content items appearing within different date panes may be related to each other. For example, task items in different panes may be related to the same project. In accordance with some embodiments, the calendar UI includes a content item association indicator. In some embodiments color coding acts as a content item association indicator. More specifically, color coding is used to create a visible association among displayed content items. For example, all items associated with a first project may be associated with a first color (e.g., orange); all visual content items associated with a second project may be associated with a second color (e.g., green); and all visual content items that are not associated with a project have no special background, and therefore are displayed with a third (default) color (e.g., white) as background.

For example, a project may involve development of a marketing plan for a new product. Some visual content items associated with the marketing project may represent tasks to be performed in connection with the project, for example. Other visual content items associated with the marketing project may represent persons who are involved with performing the tasks, for example. More specifically, for example, certain visual content items shown within the date panes of the illustrative calendar UI instances of FIG. 1A and of FIGS. 1B-1C represent tasks. Other visual content items may represent other aspects of the marketing plan.

Referring to the calendar UI instance of FIG. 1A, for example, first visual content items indicated within the date panes for June 18, 23 and 26 and July 4 represent four different tasks that are associated with a first project. The first project corresponds to the first color (e.g., orange), and accordingly, the task items associated with the date panes for June 18, 23 and 26 and July 4 are displayed with the first color (orange) as background. The task associated with June 18, for example, is described as "[10] beta for calendar or entire team", which may mean that on June 18, the person assigned this task will perform a 10 minute test, for observation by the entire marketing team, of the new calendar software. Similarly, second visual content items indicated in the example calendar UI within the date panes for June 26 and 30 represent tasks associated with a second project that is associated with the second color (e.g., green). Accordingly, the task items associated with the date panes for June 26 and 30 are displayed with the second color (green) as background. However, third visual content items indicated in the example calendar UI within the date panes for June 26 and July 1 represent two different tasks that are not associated with a particular project. Accordingly, these task items within the date panes for June 26 and July 1 are displayed with no special background color and instead are displayed on a (default) a color (white) as background.

Continuing to refer to the calendar UI instance of FIG. 1A, for example, other visual content items are shown within the date panes of the illustrative calendar UI instance represent persons, for example. Specifically, photos of persons responsible for tasks associated with the first project are overlaid within first visual content items representing the first color coded tasks shown on the date panes for June 18, 23 and 26 and July 4. Similarly, photos of persons responsible for tasks associates with the second project are overlaid within second visual content items representing the second color coded tasks shown on the date panes for June 26 and 30. Likewise, photos of persons responsible for tasks associated with the third project are overlaid within third visual content items representing third non-color coded tasks shown on the date panes for June 26 and July 1.

Another example visual content item shown within the date panes of the illustrative calendar UI instance of FIG. 1A, for example, represents status of a task. Specifically, for example, the check mark overlaid within the third visual content item representing a third color non-coded task associated with the date pane June 26 indicates that the task described as, "Send out June Newsletter", has been completed.

Yet another visual content item shown within the date panes of the illustrative calendar UI instance of FIG. 1A, for example, represents a tag, for example. The box icon shown overlaid within the first task item associated with the June 26 date pane and the box icon overlaid within the second task item associated with the June 30 date pane represent tags that may be used to associate these task items with one or more keywords, for example. Thus, for example, both tags may be associated in a non-transitory storage device (not shown) with the keyword "budget", such that a search query that includes the term "budget" can be used to identify the first and second projects.

Process to Expand and Compact Date Panes

Figure 1D:
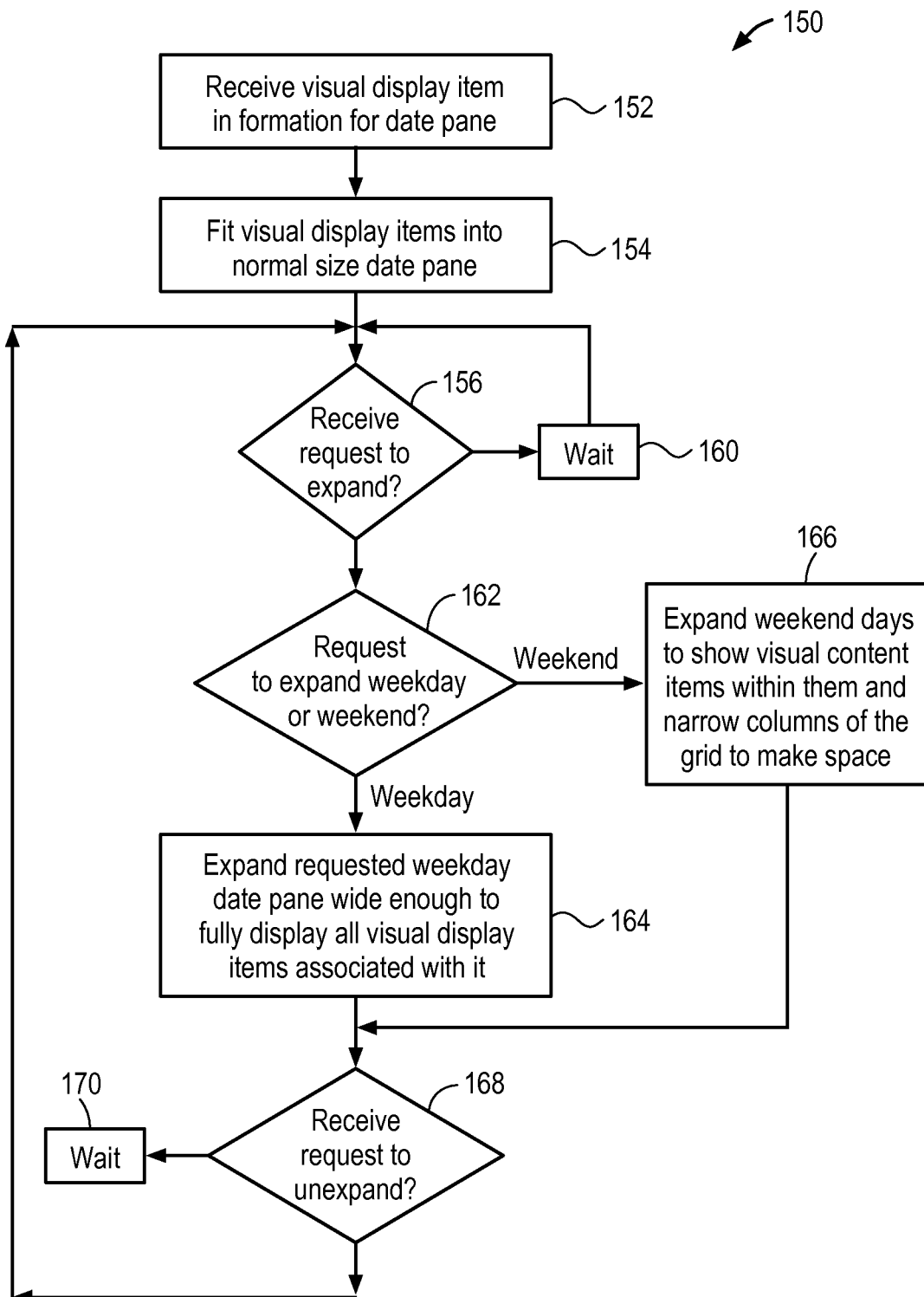
FIG. 1D is an illustrative drawing representing a process to expand and compact date panes in a calendar UI instance, in accordance with some embodiments.

FIG. 1D is an illustrative drawing representing a process 150 to expand and contract date panes in a calendar UI instance, in accordance with some embodiments. Module 152 configures a computer system to receive visual display item information for display in one or more date panes. The information may include one or more code objects used by the computer system to generate visual display items within a date pane. Module 154 configures the computer to fit the visual display objects within normal size date panes. Normal size date panes are large enough to display to display some but not necessarily all associated visual content items. Normal size date panes are displayed during normal operation when no expansion or compaction of date pane size is invoked. The normal size date pane for Jul $4^{th}$ in FIG. 1A, for example, is large enough to display at least three visual content items, and it has additional space to display even more of them. If there are too many visual content items associated with a given normally sized date pane, then some of the visual content items will not be displayed, and instead, an indicator may be provided such as "2 more" to indicate that the date pane is associated with visual content items that are not currently displayed.

Decision module 156 configures the computer to determine whether a user request to expand a pane has been received. A request to expand may include user pointing and clicking on a region of a date pane in accordance with some embodiments, for example. Decision module 156 waits for a user input received requesting date pane expansion, as indicated by module 160. Decision module 162 configures the computer to determine whether a received user request to expand is a request to expand a weekday date pane. A user may make a request to expand a weekday pane by selecting a prescribed region of a date pane in accordance with some embodiments.

In response to a determination by decision module 162 that the received request is a request to expand a weekday date pane, module 164 expands the selected weekday date pane to be tall enough to fully display additional visual display items associated with the selected date pane that were not displayed previously. Module 164 configures the computer to also expand by the same amount all other panes in the same row as the date pane selected for expansion. Alternatively, the user selection may be a selection of a date pane row for expansion, which results in expansion of all date panes in the row to be tall enough to display additional visual display items associated with date panes in the selected row that were not previously displayed. In some embodiments, the work day date panes are expanded to be tall enough to display all visual content items within the selected work day date pane or within the selected row of work day date panes.

In response to a determination by decision module 162 that the received request is a request to expand a weekend date pane, module 166 expands all weekend panes having the same weekend date as the selected weekend date pane. In other words, in response to a user selection of a Saturday date pane, the entire column of Saturday date panes is expanded, and in response to a user selection of a Sunday date pane, the entire column of Sunday date panes is expanded. Module 166 configures the computer to also compacts, i.e. makes narrower, weekday date panes by an amount sufficient to make room on the display screen for the expanded weekend date panes.

Decision module 168 configures a computer to determine whether a user request is received to compact an expanded date pane, either a workday date pane or a weekend date pane. In response to receipt of a user request to compact, control flows to back to decision module 156. Decision module 168 waits for a user input received requesting date pane expansion, as indicated by module 170.

Overview of Process to Generate Calendar UI

Figure 2:
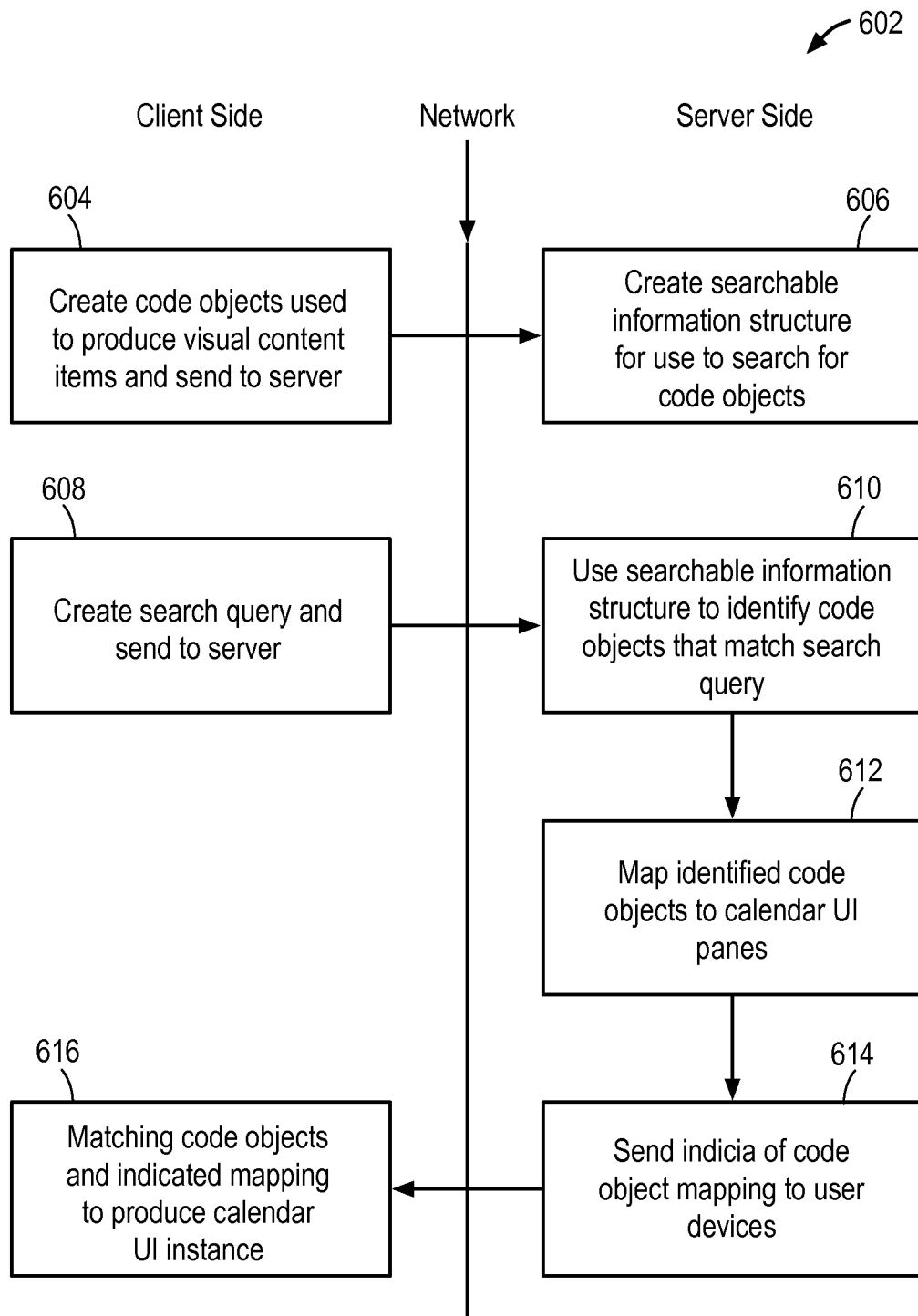
FIG. 2 is an illustrative generalized flow diagram representing in general terms activities performed by client user devices and by a server system and the flow of information between them in accordance with some embodiments.

FIG. 2 is an illustrative generalized flow diagram representing in general terms activities performed by client devices and by a server system and the flow of information between them in accordance with some embodiments. The client devices comprise user devices, which are clients of a server system. The client devices and the server system communicate with each other over a network. The server system, which may include one or more different computer systems, processes information received from client user devices and uses that information to provide information to the user devices used by the devices to produce calendar UIs. The client user devices receive information from users and provide that information to the server system for processing to generate calendar UIs on the client user devices. Information received from multiple different user devices may be used by the server system to generate a calendar UI version that is delivered to multiple user devices. Thus, the server system may assemble a custom calendar UI version that is displayed by multiple different user devices based upon user input received from users of a number of different user devices, Generally speaking, activities of client devices and server system fall within two categories. The first category is generation and organization of visual content items used to produce and display visual content items. The second category is producing search queries and the generation of custom calendar UI instances based upon the search queries.

Within the first category of activity involving generation and organization of visual content items, block 604 represents in general terms user activities involved with creation of code objects used to produce visual content items displayed in a calendar UI. The code objects include information structures stored in a non-transitory computer readable storage device that are used by client devices to generate visual content items on device screens. Users provide information that indicates attributes of visual content items which are stored within code objects that are later used to cause client devices to the display of the visual content items. Many different users may generate code objects. The code objects are sent over a network to the server system for processing.

Also within the first category of activity, block 606 represents in general terms server system activities involved with organizing and management of code objects created by users of client devices. The server system identifies searchable attribute information within user-created code objects and creates one or more searchable information structures used to search for code objects based upon attributes that may be specified in user search queries. In accordance with some embodiments, creating the one or more searchable information structures involves chronologically ordering code objects based upon date information associated with the code objects and performing forward and backward chronological searches through the ordered code objects. In accordance with some embodiments, the searchable information structures include one or more index structures.

Within the second category involving producing search queries and generating custom calendar UI instances based upon the search queries, block 608 represents in general terms one or more users creating search queries and sending the search queries to the server system. Search queries identify attributes to be matched with code object attributes to create calendar UI instances. Different users may define different search queries used to produce different calendar UI instances. Client user devices send the search queries over the network to the server system.

Also within the second category of activity, block 610 represents in general terms, server system activities involved in the use of the one or more searchable information structures to identify code objects that have attributes that match attributes identified within search queries received from client user devices. Block 612 represents in general terms server system activities involved with mapping code objects matched to a search query to calendar UI date panes. Block 614 represents in general terms the server system sending to client user devices indicia of the code object mappings to client user devices for use in display of custom calendar UI instances on client user device display screens.

Also within the second category, block 616 represents in general terms client user device activities using the object code mapping indicia received from the server system to calendar UI instances for display. The code objects mapped to date panes are used to produce corresponding mapped visual content items mapped to those date panes. Thus, visual content items produced using code objects defined by different users may be incorporated into a custom calendar UI produced in response to a search query.

UI to Create Visual Content Item

Figure 3:
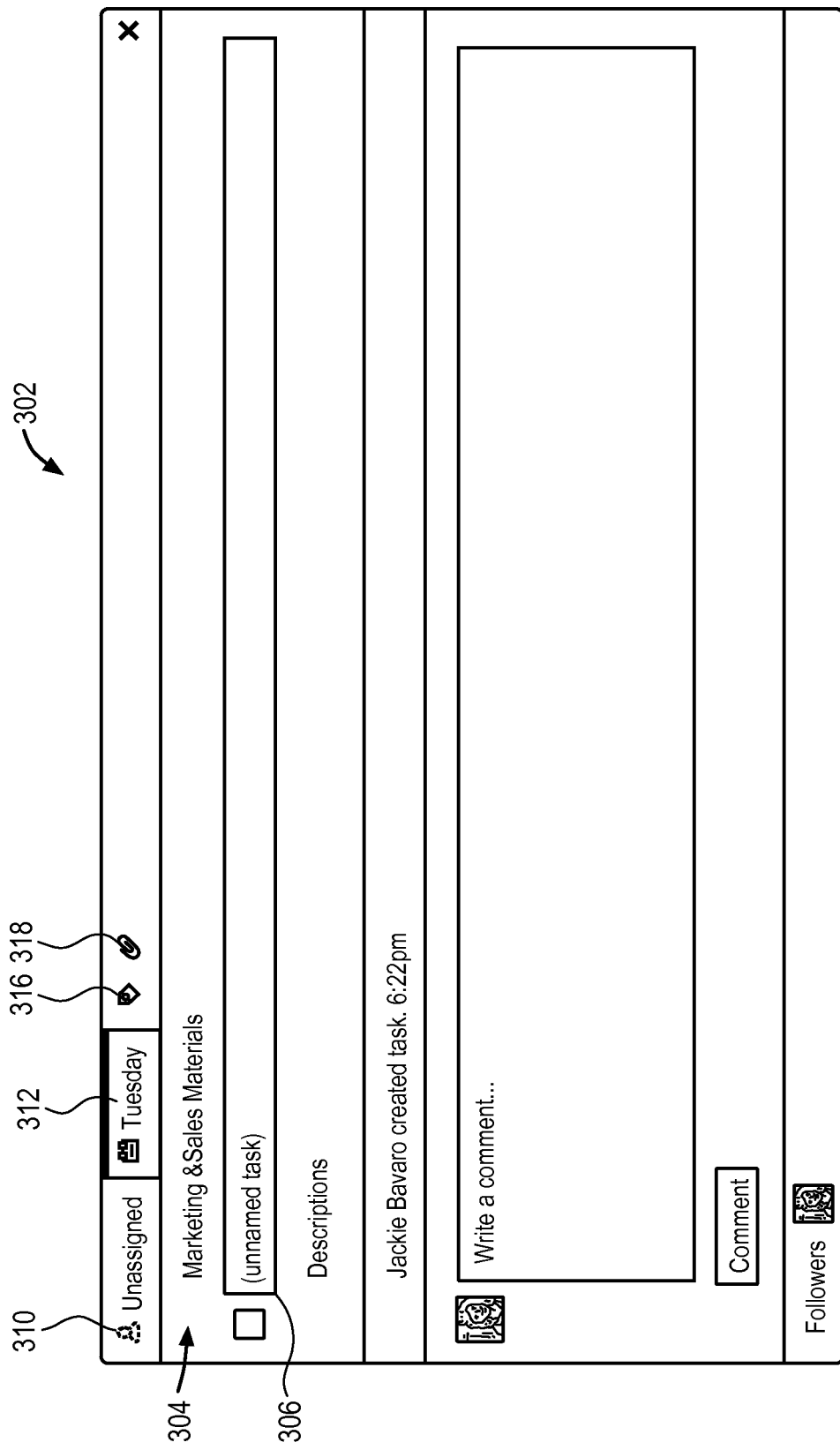
FIG. 3 is an illustrative drawing of an example of a first user interface screen display to receive user input to define a new visual content item for display within a calendar UI in accordance with some embodiments.

FIG. 3 is an illustrative drawing of an example of a first user interface screen display 302 to receive user input to define a new visual content item for display within a calendar UI in accordance with some embodiments. More specifically, the first UI display 302 is used to receive user entries to define a new code object (not shown) that is used to generate a visual content item in accordance with some embodiments. The dialog screen display 302 of FIG. 3 is displayed in response to a user selecting the numerical date within a calendar UI instance such as that of FIG. 1A. In the example first user interface dialog display 302, it is assumed that a project exists that is named, "Marketing & Sales Materials", identified within a project field 304, and the UI screen display of FIG. 3 represents user activity to create a new visual content item that represents a new task, the "(unnamed task)", identified within a task field 306, associated with the project. The example first user interface screen display 302 indicates the name of the task creator, the time of task creation and provides a photo of the task creator.

Selectable tabs along a top and bottom portions of the example first UI display 302 permit a user to specify attributes of the task. In response to user selection of a first tab 310, a pull-down menu (not shown) is displayed in which to select an assignee attribute associated with a task. In response to user selection of a second button 312, a pull-down menu (not shown) is displayed in which to select a date pane attribute (e.g., a date) associated with the task item is to be displayed. In response to user selection of a third button 316, a pull-down menu (not shown) is displayed in which to specify a search term to associate with the task. In response to user selection of a third tab 318, a pull-down menu (not shown) is displayed in which to specify an attachment attribute. In response to user selection of a fifth button 324, a pull-down menu (not shown) is displayed in which to specify additional actions associated with the task attribute.

FIG. 4 is an illustrative drawing of an example expanded view of a visual content item 402 that can be created using the first UI display 302 of FIG. 3 in accordance with some embodiments. Referring to the example calendar UI of FIG. 1A, the July 1 date pane displays a visual content item labeled with the task, "Review Sales Presentation", which is shown in expanded form in FIG. 4. The visual content item 402 is displayed in response to a user input to select, e.g., click on, the visual content item labeled, "Review Sales Presentation" in the calendar UI display grid. The expanded visual content item 402 includes a task field 404 containing the task name, "Review Sales Presentation". The expanded item 402 includes a status field 406 that indicates "Updated with new branding" and includes a check mark indicating that the task has been started. The expanded item 402 includes an attachment field 408 indicating that a "Sales Presentation" attachment is provided. The expanded item 402 includes a revision history field 410 that shows numerous revisions and the revision contributors. The revision history field 410 includes an image 412 associated with one the revision contributors. The expanded item 402 includes a comments field 414 in which users can enter comments. The expanded item includes a tag 416 that can be used to provide a visual indication of the expanded item 402 having a relationship with another visual content item, such as through color coding, for example. Thus, it will be appreciated that users can modify a visual content item after its initial creation, through revisions or comments or updating status, for example.

Code Object Used to Generate Visual Content Items

Figure 5:
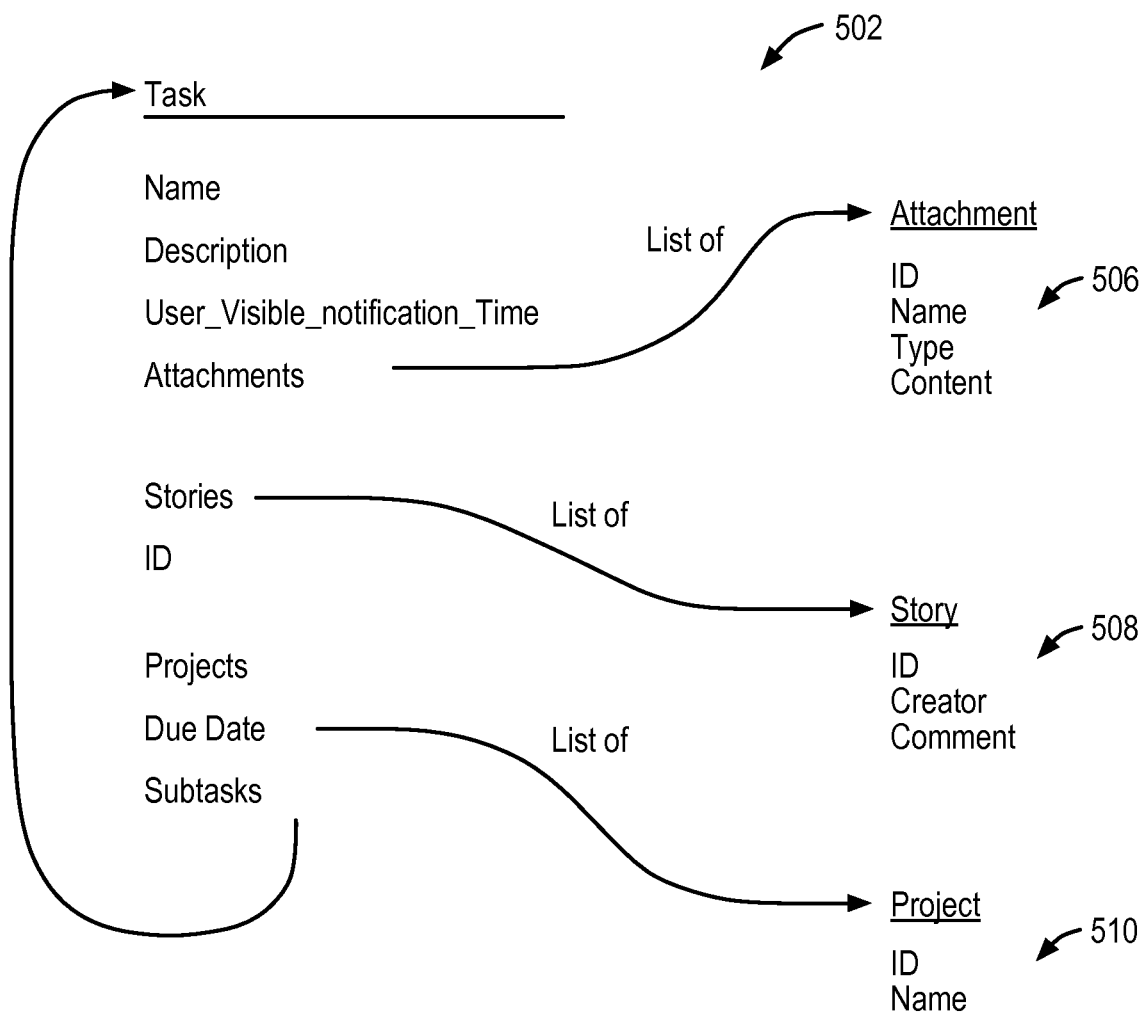
FIG. 5 is an illustrative drawing showing a portion of an example code object stored in a computer readable storage device in accordance with some embodiments.

FIG. 5 is an illustrative drawing showing certain details of an example code object 502 stored in a non-transitory computer readable storage device (not shown) that can be used to generate a visual content item in accordance with some embodiments. In accordance with some embodiments, a code object is adapted for use to generate a corresponding visual content item in that computer program code (not shown) configures a client user device to interpret the code object in generating the corresponding visual content item. It will be appreciated that visual content items are rendered in a user interface screen of an end-user device in real time during display of a calendar UI instance. More particularly, in some embodiments a rendering engine, such as a browser (not shown), renders a calendar UI date pane display grid and renders content items displayed within individual date panes of the display grid. The rendering engine uses a code object, which is presented in a programming language such as JavaScript, which can be interpreted by a browser, to guide the rendering of a visual content item that corresponds to the code object. A user can use a first user interface screen display like that of FIG. 3 to specify attribute values of a visual content item represented within a code object such as the example code object 502 of FIG. 5, which in turn, is used to create a corresponding visual content item, such as the visual content item 402 of FIG. 4, within a date pane of a calendar UI instance The example code object 502 is a "task" code object. The example code object 502 includes a first list of attributes 504. The attributes 504 of example code object 502 include Name, Description, User-visible notification time, etc. Each attribute in the list can have a user-assigned (or default) attribute value associated with it. Some attributes within the code object 502, themselves, include attributes, An Attachments attribute is associated within the code object 502 with a second list of attributes 506 that includes ID, Name, Type and Content. A Stories attribute is associated within the code object 502 with a third list of attributes 508 that includes ID, Creator and Content. A Projects attribute is associated within the code object 502 with a fourth list of attributes 510 that includes ID and Name. In some embodiments, a user may assign attribute values to a code object through a user interface screen display like that of FIG. 3, for example.

UI to Create Search Query

FIG. 6 is an illustrative drawing of an example second user interface screen display 802 to receive user input to specify a search query to define a new calendar UI instance in accordance with some embodiments. In some embodiments, a user invokes the screen display 802 of FIG. 6 by clicking on a query menu selector button 110 shown in the upper right corner of the calendar UI of FIGS. 1A-1C. The query is used to determine visual content items that will appear on a calendar UI.

The example second user interface screen display 802 includes multiple search fields that used to identify search attributes to be matched with attributes of one or more code objects used to generate corresponding visual content items. A user can enter search attribute information into the first search field 810 labeled, "Contains the words", to include in a task attribute query a search for matches with any words in the name, description, or comments of previously created in a code object used to produce a visual content item that represents a task, as well as the name of the Creator or Followers, or the Project Name. A user can enter search attribute information into the second search field 812, "Assigned to", to extend the search to code objects used to produce visual content items representing tasks assigned to particular individuals. A user can enter search attribute information into the third search field 814, "In projects", to extend the search to code objects used to produce visual content items representing tasks assigned to particular projects. A user can enter search attribute information into the fourth search field 816, "Tagged with", to extend the search to code objects used to produce visual content items tagged with a particular word or phrase, for example. A user can enter search attribute information into the fifth search field 818, "Attachments Only", to extend the search to code objects used to produce visual content items that represent tasks associated with an attachment. A user can enter search attribute information into the sixth search field 820, "Due within the Next", to extend the search to code objects used to produce visual content items for tasks that have been completed or to extend the search to tasks that are incomplete. A user can enter search attribute information into the seventh search field 822, to extend the search to code objects used to produce visual content items that represent tasks that have due dates within a specified date range. A user can enter search attribute information into the eighth search field 824, "In Teams", to extend the search to code objects used to produce visual content items that represent that tasks that are in projects that are in specified teams. A user can enter search attribute information into the ninth search field 828, "Search by another Field", to display additional search fields.

A user-defined search query defined through user entries into the example second user interface screen display 802, is stored in non-transitory computer readable storage device (not shown) and is used to search for matches among one or more stored task objects, which in turn, are used to generate corresponding visual task items for display within date panes of the calendar UI.

Producing Searchable Attribute Information

Figure 7:
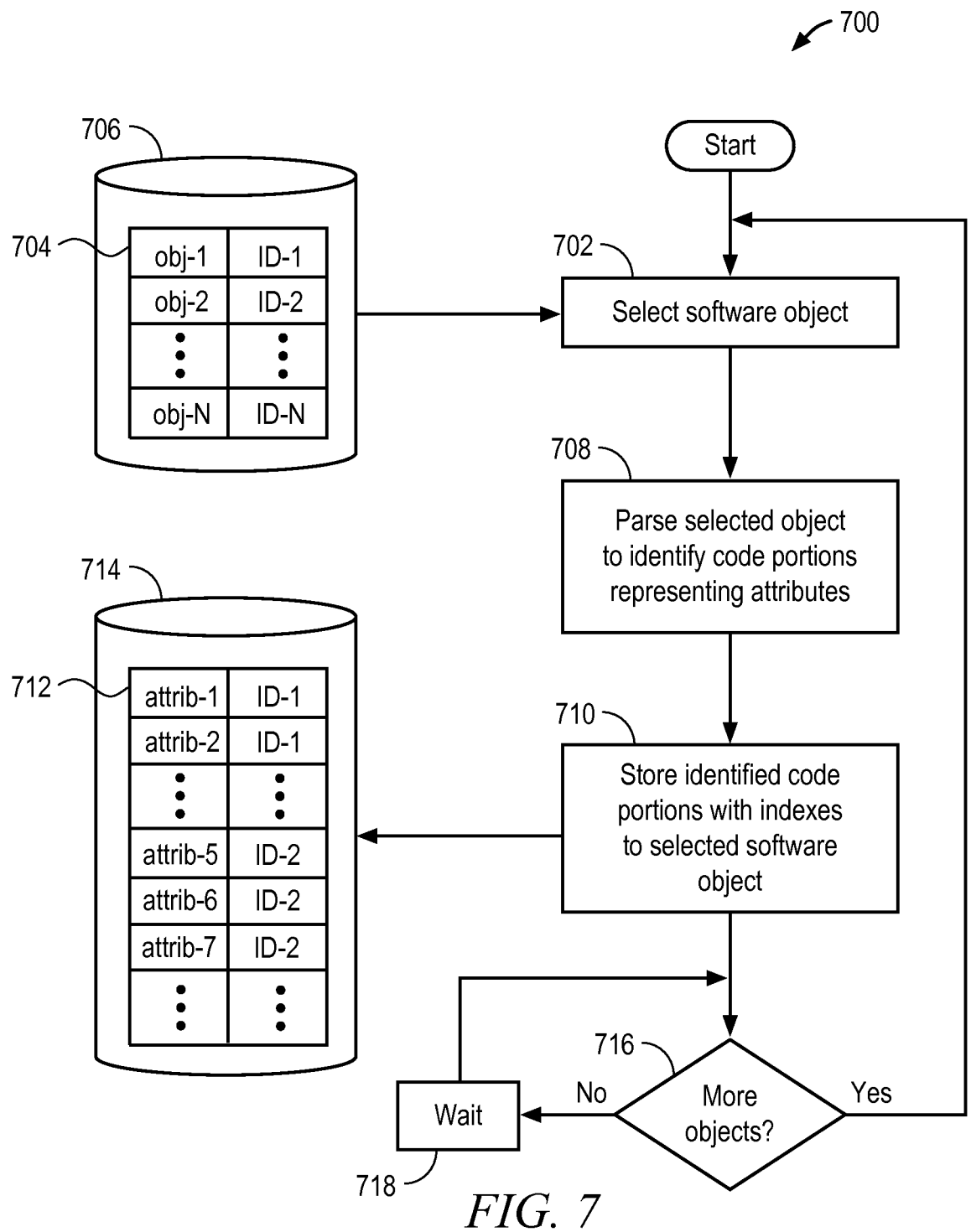
FIG. 7 is an illustrative flow diagram representing a process to produce a searchable task attribute information structure in accordance with some embodiments.

FIG. 7 is an illustrative flow diagram representing a server system process 700 to produce a searchable attribute information structure in accordance with some embodiments. The process 700 is described in the context of illustrative example code objects and attributes. Module 702 configures a computer to select a code object from a code object database 704 stored in a non-transitory storage device 706. The stored code objects may be created using the first user interface screen display described with reference to FIG. 3. Module 708 configures a computer to parse the selected object to identify code portions that can act as searchable object attributes (also referred to herein as searchable attributes). In some embodiments, the identified code portions that can serve as searchable object attributes include one or more of strings, time stamps, integers and Booleans, for example. In the course of identifying searchable attributes, module 708 strips out from the code object symbols such as pointers that are not useful as searchable attributes. Module 710 configures a computer to index the identified searchable attributes to the code objects that they correspond to and stores the identified indexed searchable attributes in a searchable attribute database 712 within a non-transitory storage device 714.

In some embodiments, indexing involves associating searchable attributes (e.g., attrib-1, attrib-2, etc.) with unique identifiers (e.g., ID-1, ID-2, etc.) within the searchable attribute database 712 and associating corresponding code objects (obj-1, obj-2 . . . obj-N) with the same unique identifiers (e.g., ID-1, ID-2, etc.) within the code object database 704. In some embodiments, the unique identifiers include numerical identifiers. It will be appreciated that a given code object may correspond to multiple searchable attributes. Each searchable attribute is associated with the same unique identifier that is associated with its corresponding code object. Thus, for example, assuming that object, obj-1, is associated with searchable attributes, attrib-1 and attrib-2, identifier ID-1 is associated both with obj-1 and with attrib-1 and attrib-2.

Decision module 716 configures a computer to determine whether there are additional code objects in the software database 704 to be processed. If yes, then control flow returns to module 702. If no, then control flows to module 718, which waits for some time interval, which may be fixed or variable, after which control again flows to decision module 714.

FIG. 8 is an illustrative drawing of a table that identifies multiple different kinds of example task attributes and provides brief descriptions of some of them in accordance with some embodiments. The searchable attribute database 712 may include searchable code portions that correspond to one or more of these kinds of attributes. Of course, it will be appreciated that the same attribute type (e.g., task creation date, comments or assignee) may be identified for each of multiple different code objects, but that these multiple different code objects may have different values for these attributes (e.g., a different date, different comments or a different assignee). Thus, as explained more fully below, a search query may match some of the attributes corresponding to some of the different code objects but not others.

Identifying Query Matches and Ordering Matching Code Objects

Figure 9:
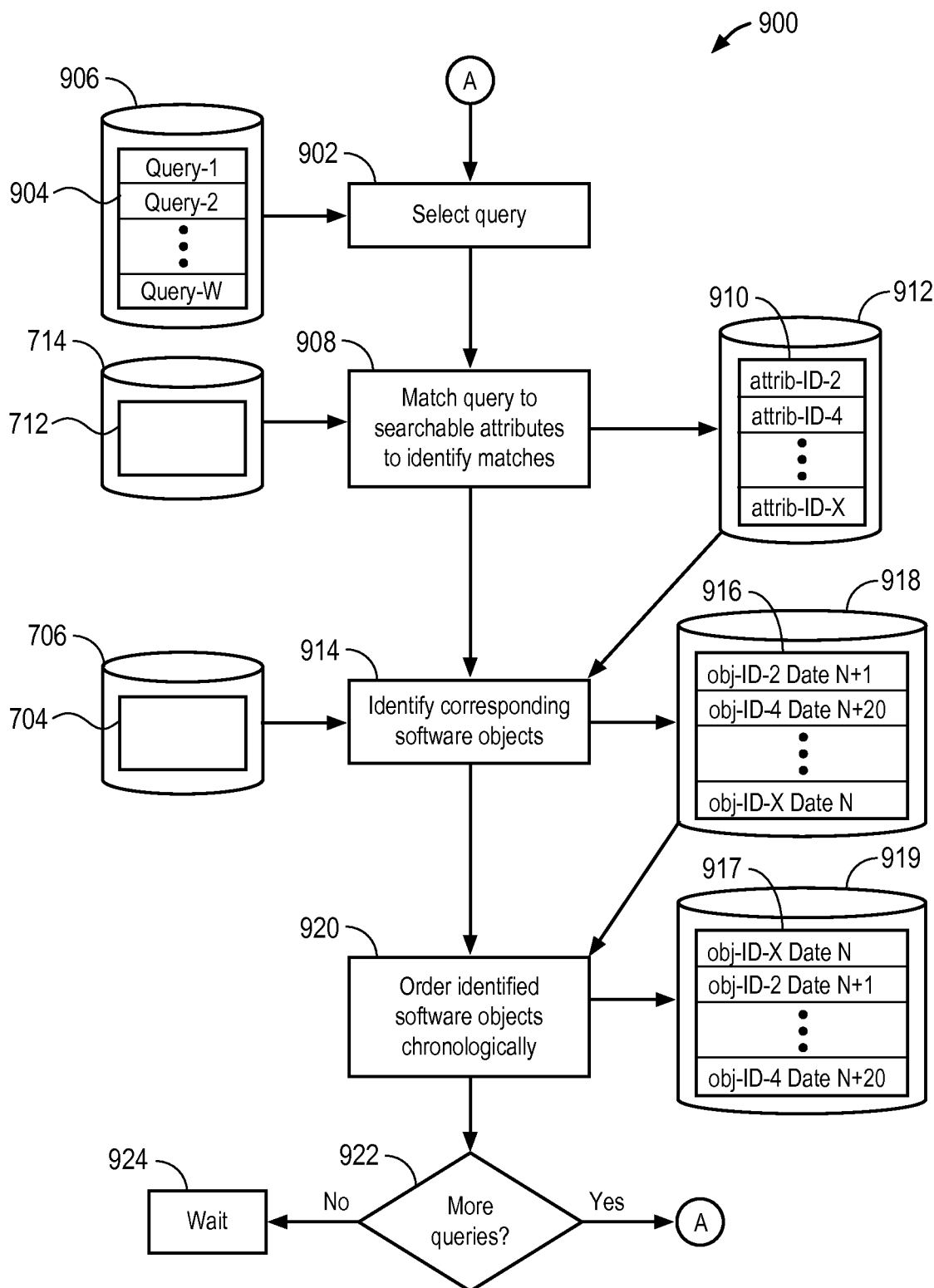
FIG. 9 is an illustrative flow diagram representing a server system process to match search query to code objects and to chronologically order code objects in accordance with some embodiments.

FIG. 9 is an illustrative flow diagram representing a server system process 900 to match search query to code objects and to chronologically order code objects in accordance with some embodiments. The process 900 is explained in the context of illustrative example search query, code objects and attributes. Module 902 configures a computer to select a search query from a search query data structure 904, such as a table, for example, stored in a non-transitory storage device 906. Multiple client user devices may create the search queries stored within the data structure 904 using the second user interface screen display described with reference to FIG. 6. Module 908 configures a computer to match the attributes identified by the selected query to searchable attributes within the attribute database 712 to identify attributes that match the query. The example matching code objects are ordered based upon their associated dates from the earliest date N through the latest date N+1.

The search query may include Boolean logic such as AND, OR and NOT to indicate require attributes for matching. For example, referring to the illustrative query displayed in the calendar UI of FIG. 1A, module 908 configures the computer to search for attributes that include strings, date stamps or integers that match both "Weekly Marketing Meeting Agenda" and "Marketing & Sales Materials" or that match "Goals Q2 2014". More particularly, for example, referring to the illustrative second user interface screen display of FIG. 6, in accordance with some embodiments, each attribute field (e.g., contains the words, assigned to, in projects, etc.) has its own definition of whether it uses AND or OR to combine the inputs in that attribute field. In some embodiments, the AND/OR definition is user selectable. If the various attributes are combined with AND, then they all need to match. If the various attributes are combined with OR, then at least one needs to match. For example, in accordance with some embodiments, if "apples" and "bananas" is entered into field 810, and Jack and Jill is entered into filed 812, then field 810 has a definition that requires all of the words, while field 812 has a definition that requires at least one of the words. So this example search will find objects that have Both apples & bananas to satisfy the constraints in field 810, AND either Jack or Jill to satisfy the constraints in field 812.

Attributes that are determined to match the selected query, together with their associated identifiers, are stored in a data structure 910, such as a table, within a non-transitory storage device 912. In the illustrative example, attributes having ID-2, ID-4 and ID-X are some of the attributes determined to match the search query. Module 914 configures the computer to identify code objects from the database 704 that have attributes that correspond to the matching attributes within the data structure 910 and to store the corresponding code objects in a data structure 916, such as a table, within a non-transitory storage device 918. Each code object corresponds to a time, such as a calendar date. A user may define the date associated with a code object when the user creates the code object. For example, the matching code object identified by ID-2 corresponds to date N+1. In some embodiments, module 914 identifies corresponding code objects by comparing identifiers associated with matching attributes with identifiers associated with stored code objects. Module 920 configures the computer to chronologically order a stored set 919 of the matching code objects from the data structure 916 within a non-transitory storage device 917. The examop In some embodiments, for example, a list of project names may be presented to a user through a UI menu (not shown). Each project in the list may correspond to an identifier. A user may select one or more projects from the list, which become part of the query. The identifiers associated with the selected project names are used to locate corresponding code objects.

It will be appreciated that each identified code object includes date information that may have been specified by a user, or auto-generated, when the object was first created or subsequently modified. For example, a user may actuate tab 312 in the illustrative first user interface screen display shown in FIG. 3 to select a date. The example code object code of FIG. 5 includes date information. In accordance with some embodiments the code objects' date information is used to determine chronological ordering.

Decision module 922 configures a computer to determine whether there are additional code objects in the software database 904 to be processed. If yes, then control flow returns to module 902. If no, then control flows to module 924, which waits for some time interval, which may be fixed or variable, after which control again flows to decision module 922.

Forward and Reverse Chronological Search and Mapping

Figure 10:
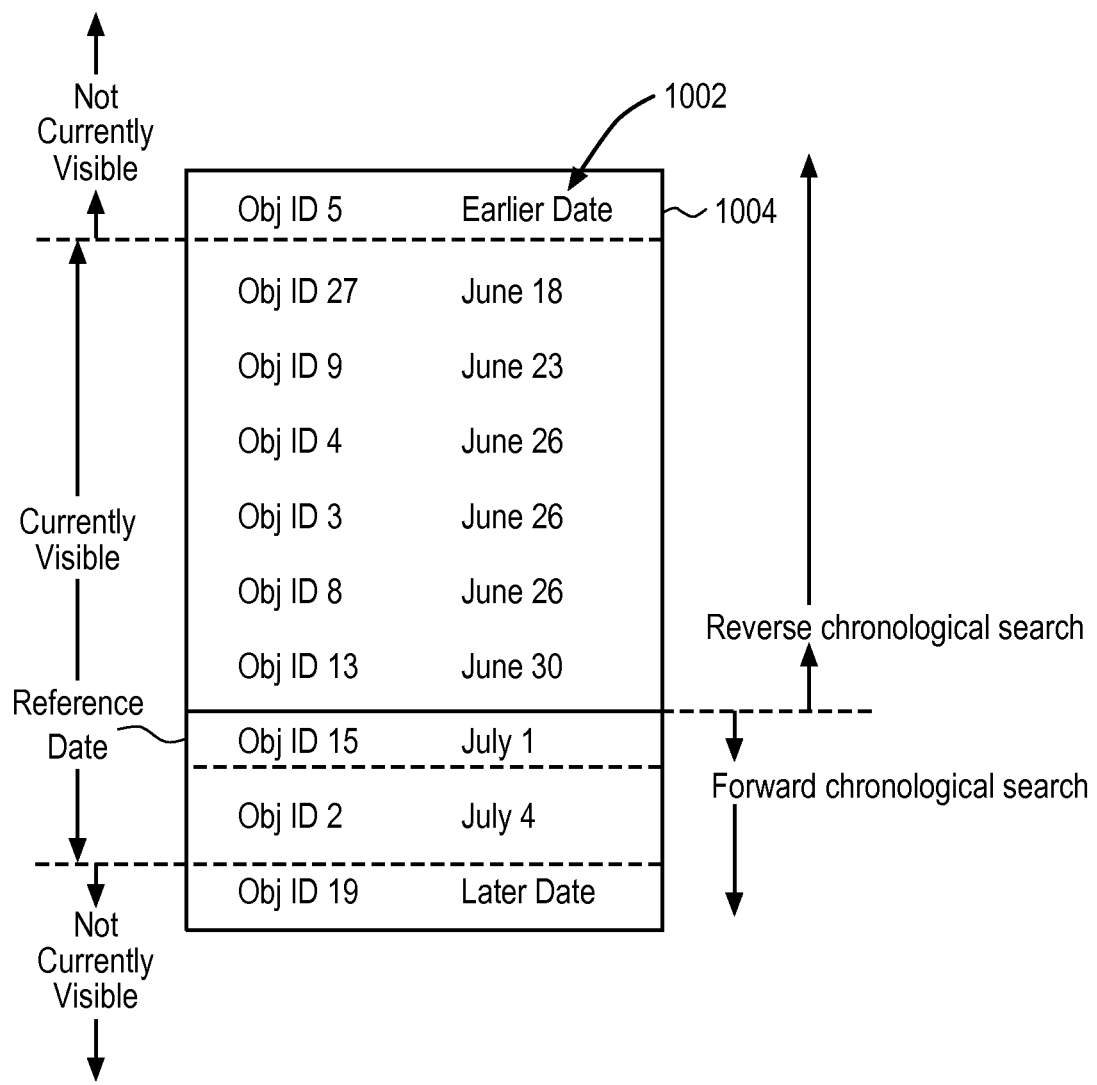
FIG. 10 is an illustrative drawing representing an example chronologically ordered set of the code objects stored in a computer readable storage device produced according to the process of FIG. 9 in accordance with some embodiments.

FIG. 10 is an illustrative drawing representing certain details of an example chronologically ordered set of the code objects 1002 within a code object ordering information structure 1004 stored in a computer readable storage device (not shown) produced according to the process 900 of FIG. 9 in accordance with some embodiments. The example chronologically ordered set of code objects 1002 are used to produce corresponding visual content items displayed within date panes of the example calendar UI instance of FIG. 1A, which is produced on a client user device display screen. The example chronologically ordered set of objects 1002 will be used to explain use of forward and reverse mapping of visual content items to calendar panes in accordance with some embodiments.

More particularly, the example chronologically ordered set of code objects 1002 is shown stored in a table data structure that includes a left side column that identifies multiple objects and a right side date column that identifies associated dates. Different objects correspond to different object identifiers (IDs) that are shown with arbitrary values selected for the purpose of this example. Each object is associated with a date. For example, the object associated with ID3 is associated with the date June 26. More specifically, the objects are ordered chronologically from an example earlier date, which is not specified in the drawing, which is associated with the object having ID5, and which is earlier than the date of the earliest date pane within the currently visible date range of the example calendar UI of FIG. 1A, i.e. earlier than June 17, to a later date, which is not specified, which is associated with the object having ID19, and which is later than the date of the latest date pane within the currently visible date range of the example calendar UI of FIG. 1A, i.e. later than July 12.

It will be appreciated that certain objects within set 1002 are associated with dates in the currently visible range of a client user device, and others are associated with dates that are outside the currently visible range. In accordance with some embodiments, different client devices may have different size viewing screens areas. A Browser, for example, running on a client device may determine the device's viewing area, which in turn, may determine the range of currently visible date panes on the device display screen.

Referring to both FIG. 1A and FIG. 10, it will be appreciated, for example, that object ID13 in the ordered set 1000 is mapped to date pane June 30 in the calendar UI and that the object ID13 also is used by a rendering engine, within a browser, for example, to generate the visual content item containing the message, "[10 m] Communicating/improving . . . ".

The current date in the example calendar UI of FIG. 1A is selected to act as the reference date in the chronologically ordered set of objects 1000 of FIG. 10. The term 'reference date' is used to refer to a date that demarcates a boundary between the forward and reverse searches. There is no requirement of an equal number of calendar date panes being visible before and after the reference date. Moreover, in accordance with some embodiments, the reference date may determine the boundary between date panes within the currently visible range and date panes outside that range. For example, the reference date may be specified as the earliest date within a currently visible range of date panes. In calendar UIs used for project management, for example, it sometimes is the case that future dates may be more important to display than past dates. Designating the reference date for display as the earliest currently available date ensures that at least most of the currently visible date panes correspond to future dates.

The currently visible date range of calendar UI of FIG. 1A extends from June 15 to July 12. As will be more fully explained below, a forward chronological search through the chronologically ordered set of objects 1002 proceeds starting with object ID15 associated with the date July 1 and then to object ID2 associated with July 4 and then to object ID19 associated with some later date outside the currently visible date range of the calendar UI and then may proceed to additional objects (not shown) associated with later dates outside the currently visible date range. Conversely, as will be explained more fully below, a reverse chronological search through the chronologically ordered set of objects 1002 proceeds starting with object ID13 associated with the date June 30 and then proceeds to objects ID8, ID3, and ID4 associated with June 26 and then to object ID9 associated with June 23 and may proceed to additional objects (not shown) associated with earlier dates outside the currently visible date range.

The forward and reverse searches are used to map code objects, and thus, corresponding visual content items to date panes of a calendar UI. More specifically, code objects identified during the forward and reverse searches are mapped to date panes matching the dates associated with the identified objects. Once the code objects have been mapped, a rendering engine uses the mapped code objects to generate corresponding visual content items within the mapped-to date panes.

Figure 11:
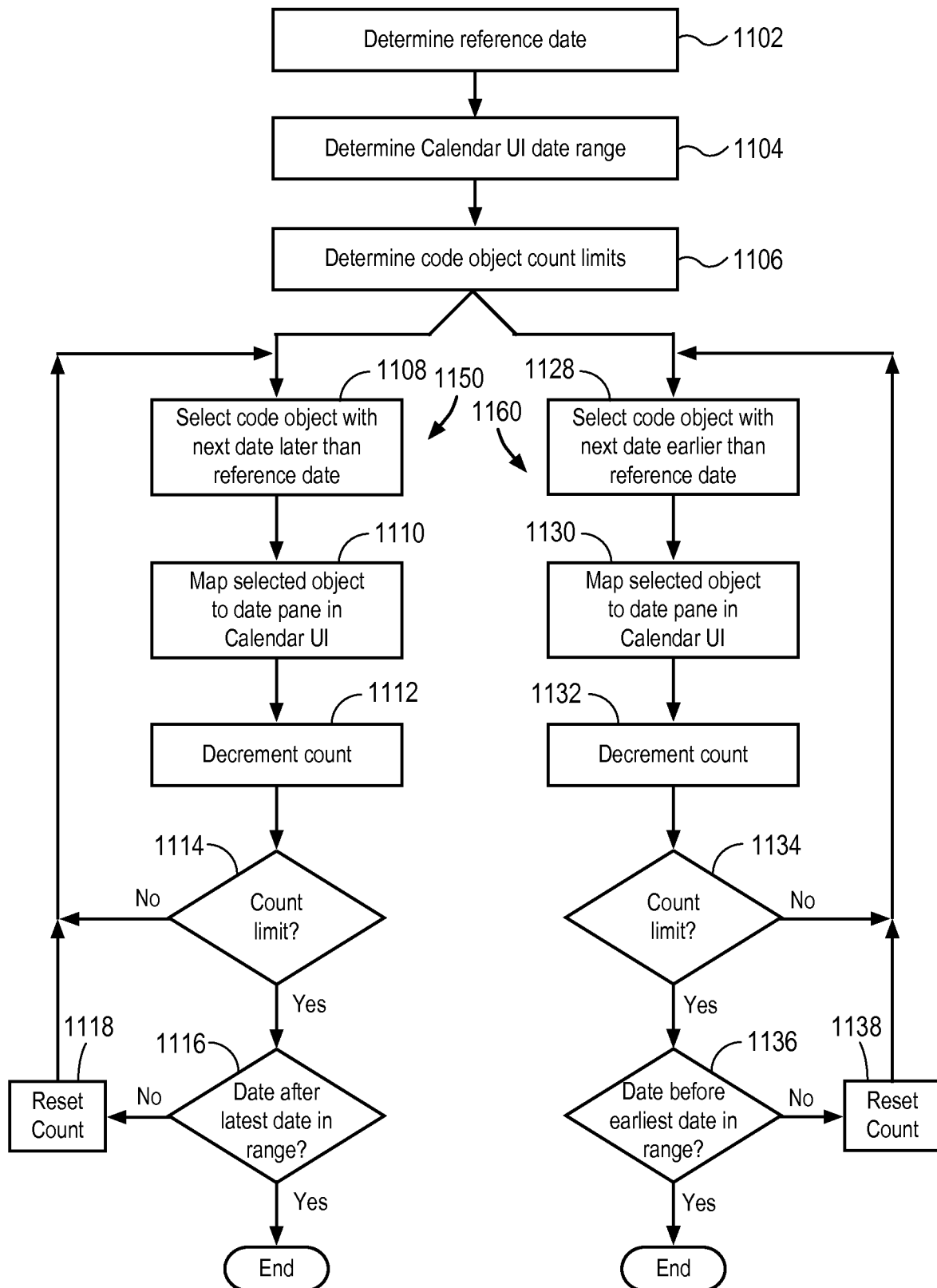
FIG. 11 is an illustrative flow diagram representing a chronological search and mapping process in accordance with some embodiments.

FIG. 11 is an illustrative flow diagram representing a chronological search and mapping server system process 1100 in accordance with some embodiments. The process 1100 shall be explained with reference to the example calendar UI of FIG. 1A and the example ordered set of the code objects 1002 of FIG. 10. Module 1102 configures a computer to determine a reference date. The reference date may be the current date or some other default date or a may be a user selectable date, for example. Module 1104 configures a computer to determine prescribed forward and backward date mapping ranges. The prescribed forward and backward date mapping ranges may be predetermined, fixed or user selectable, for example.

A prescribed forward date mapping range ordinarily encompasses a range of date panes having dates after the latest currently visible calendar UI date pane. Conversely, a prescribed reverse date mapping range ordinarily encompasses a range of date panes having dates before the earliest currently visible calendar UI date pane. In accordance with some embodiments, visual content items are mapped to a sufficient number of calendar display grid date panes in forward and reverse chronological directions relative to the reference date so that a currently visible portion of the calendar UI date pane display grid contains all visual content items that are determined to match the query for that visible portion of the calendar UI. In addition, as explained above, the mapping may proceed far enough in forward and reverse directions so that date panes of a sufficient portion of the calendar UI that is not currently visible are mapped-to so as to facilitate continuous scrolling. In other words, scrolling can proceed smoothly, i.e. without a user-perceptible delay due to a need to update mapping of additional content items to be displayed, for some range of dates before and after the currently visible range. The scrolling can occur vertically in week-by-week increments with no breaks or interruptions at month boundaries.

The range of date panes visible within an end-user device display screen may vary depending upon screen dimensions. A browser, for example, may dynamically determine device screen size, and therefore, the number of visible panes. In accordance with some embodiments, a browser API is used to query the browser to determine the browser's viewable window height. A client system can receive from the server system indicia of the mappings of code objects to date panes and can use the reference date and device screen size information to determine the currently visible range of date panes. It will be appreciated that user input may be received to cause the calendar UI instance to scroll or to jump to display a different date pane range.

The forward and reverse date ranges are selected so that mapping determinations are made not only for dates that are closest to the reference date, which are most likely to be currently visible, but also are made for dates sufficiently after and before the currently visible date panes to ensure smooth continuous forward and reverse scrolling for at least some date distance outside the currently visible calendar UI date range. For example a prescribed latest date of prescribed forward date range mapping may be selected to be sixty days after the reference date, and a prescribed earliest date of prescribed backward date range mapping may be selected to be sixty days before the reference date.

Module 1106 determines forward and reverse object count limits. The chronological search and mapping process 1100 is branched into a forward search and mapping process branch 1150 and a reverse search and mapping process branch 1160. Both the forward and reverse branches 1150, 1160 are performed as a part of the search process 1100. The forward and reverse searches are performed in chunks according to the object count limits Referring now to the forward search and mapping process branch 1150, module 1108 configures a computer to select, from the ordered set of the code objects 1002 of FIG. 10, a code object associated with the earliest date equal to or later than the reference date. Module 1110 maps the selected object to a date pane in the calendar UI that has the same date that is associated with the selected object. Thus, for example, assuming that module 1108 selects object ID15 from the object set 1002 of FIG. 10, module 1110 maps the selected object ID15 to date pane July 4 in the calendar UI of FIG. 1A.

Decision module 1112 increments a current forward count. Decision module 1114 determines whether the forward count limit has been reached. In response to a determination that the forward count limit has not been reached, control flows back to module 1108 and a next later code object is identified in the information structure 1004 and is mapped to a calendar UI date pane.

In response to a determination by decision module 1114 that the forward count limit has been reached, control flows to decision module 1116, which determines whether a latest date associated with a code object that has been mapped to a calendar UI date pane, is earlier than a prescribed latest date pane a calendar UI that is under construction. It will be appreciated that a calendar UI instance ordinarily includes both date panes that are currently visible and contiguous date panes that are not currently visible, but that could become visible soon due to user scrolling, for example.

In response to a determination that the latest date associated with a code object that has been mapped to a calendar UI date pane, is earlier than the prescribed latest date pane, control flows to module 1118, which configures the computer to reset the forward count and to cause control to flow to module 1108 to search for a next chunk of code objects. In response to a determination by decision module 1116 that the latest date associated with a code object that has been mapped to a calendar UI date pane, is later than the prescribed latest date pane, the forward search ends.

Referring now to the reverse search and mapping process branch 1160, a reverse chronological search, module 1128 configures a computer to select, from the ordered set of the code objects 1002 of FIG. 10, a code object associated with the latest date earlier than the reference date. Module 1130 maps the selected object to a date pane in the calendar UI that has the same date that is associated with the selected object. Thus, for example, assuming that module 1128 selects object ID13 from the object set 1002 of FIG. 10, module 1130 maps the selected object ID13 to date pane June 30 in the calendar UI of FIG. 1A.

Decision module 1132 increments a current reverse count. Decision module 1134 determines whether the reverse count limit has been reached. In response to a determination that the reverse count limit has not been reached, control flows back to module 1128 and a next later code object is identified in the information structure 1004 and is mapped to a calendar UI date pane.

In response to a determination by decision module 1134 that the forward count limit has been reached, control flows to decision module 1136, which determines whether an earliest date associated with a code object that has been mapped to a calendar UI date pane, is later than a prescribed earliest date pane of a calendar UI that is under construction. As mentioned above, it will be understood that a calendar UI instance ordinarily includes both date panes that are currently visible and contiguous date panes that are not currently visible, but that could become visible soon due to user scrolling, for example.

In response to a determination that the earliest date associated with a code object that has been mapped to a calendar UI date pane, is later than the prescribed earliest date pane, control flows to module 1138, which configures the computer to reset the forward count and to cause control to flow to module 1128 to search for a next chunk of code objects. In response to a determination by decision module 1136 that the earliest date associated with a code object that has been mapped to a calendar UI date pane, is earlier than the prescribed earliest date pane, the reverse search ends.

Referring to the illustrative calendar UI information structure 1200 of FIG. 12, which is explained next, the forward search and mapping results in association of code objects C1 to C9 with date pane structures, and the reverse search and mapping results in association of code objects C10 to C15 with date pane structures. The date pane structures of FIG. 12 correspond to visible date panes of FIG. 1A. The code objects C1 to C15 can be used to generate corresponding visual content items (not shown). It will be appreciated from the following discussion that mapping code objects C1-C14 to chronologically ordered date pane information structures 1210 in effect chronologically orders the code objects.

Calendar UI Information Structure

Figure 12:
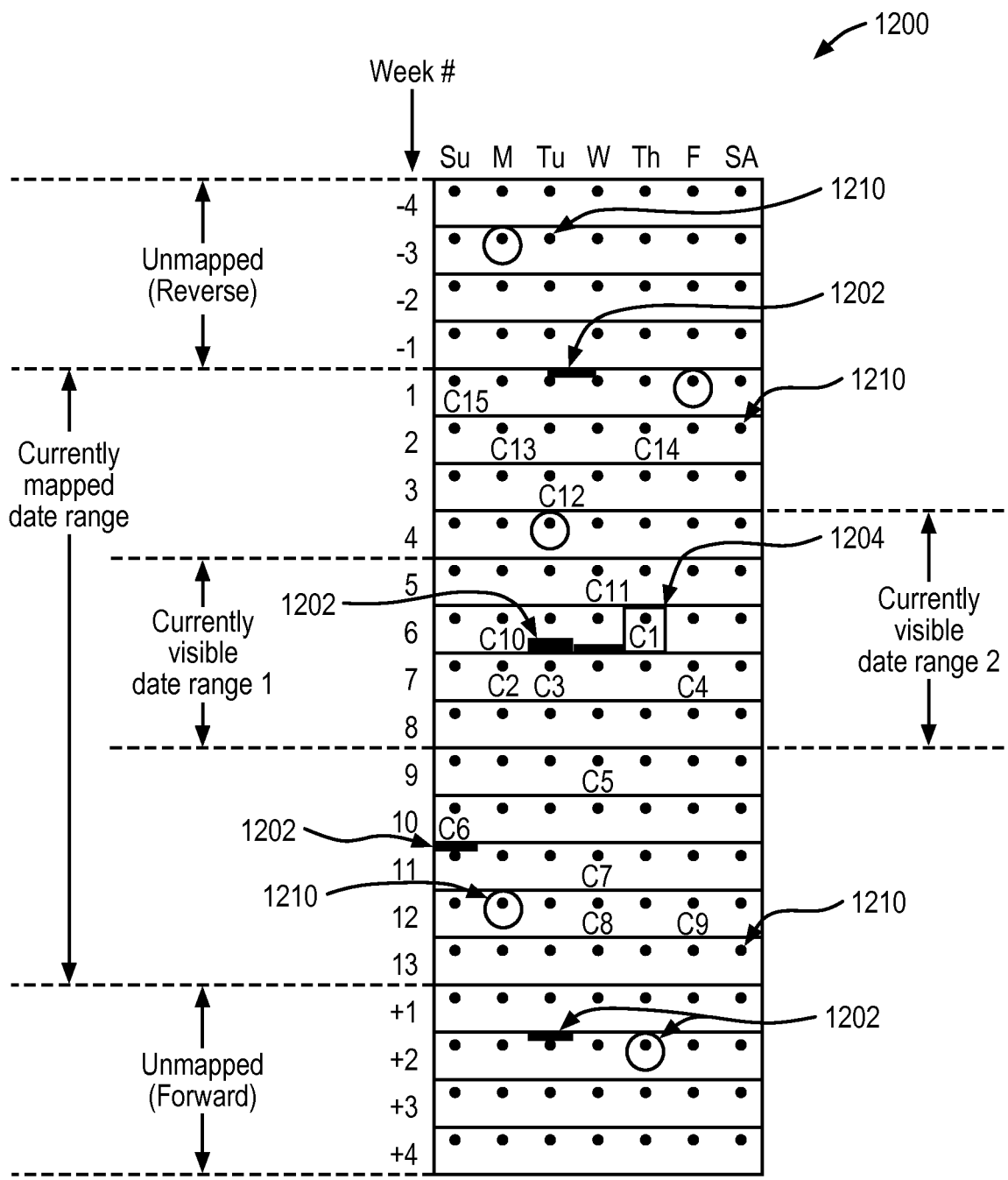
FIG. 12 is an illustrative drawing representing an example calendar UI information structure in accordance with some embodiments.

FIG. 12 is an illustrative drawing representing an example calendar UI information structure 1200 produced by a server system in accordance with some embodiments. The calendar UI information structure 1200 corresponds to the calendar UI instance 102 of FIG. 1A. The calendar UI information structure 1200 is stored in a non-transitory computer readable storage device (not shown) and can be produced according to the process of FIGS. 6-7 and 9-11. The calendar UI information structure 1200 is produced in response to a user search query, and in turn, is used to populate the date panes of one or more calendar UI instances produced in response to the query. The calendar UI information structure 1200 may be delivered by the server system over a network to client devices to guide them in mapping the code objects, and corresponding visual content items produced using the code objects, to calendar UI date panes. As will be explained more fully below, the calendar UI information structure 1200 is organized by individual dates and weeks rather than by months, which facilitates real-time incremental updating of the calendar UI as a user changes a date range currently being viewed through scrolling, for example.

More specifically, the calendar UI information structure 1200 includes a plurality of date pane information structures 1210 represented by dots in FIG. 12 that respectively correspond to date panes of a corresponding calendar UI instance produced based upon the calendar UI information structure 1200. The dot locations in FIG. 12 correspond in general to the location of the date numbers in the calendar UI instance 102 of FIG. 1A. FIG. 13 is an illustrative drawing that represents an example date pane information structure 1210 in accordance with some embodiments. The example date pane date information structure 1210 corresponds to the Jul. 22, 2014 date pane of the calendar UI of FIG. 1A. The example date pane date information structure 1210 includes a table structure 1210 that associates a date field 1304 and a code object identifier field 1306. The example date pane information structure 1210 associates the date Jul. 22, 2014 with an identifier of a code object used to produce the visual content item identified as "Approval for Budget", which is displayed in the Jul. 22, 2014 date pane of the calendar UI of FIG. 1A. Thus, the example date pane information structure 1210 contains indicia of the date Jul. 22, 2014 that is used to associate the Jul. 22, 2014 date pane of the calendar UI with the code object used to generate the visual content item to be displayed in the Jul. 22, 014 date pane of the calendar UI. It will be appreciated that although only one code object identifier is associated with the example date pane information structure 1210, it possible to associate multiple code object identifiers, corresponding to multiple visual content identifiers, with a date pane information structure. For example, a date pane information structure (not shown) that corresponds to the Jul. 26, 2014 date pane of the calendar UI of FIG. 1A would associate the date Jul. 26, 2014 with multiple code object identifiers.

Referring again to FIG. 12, the calendar UI information structure 1200, in accordance with some embodiments, organizes date pane information structures 1210 into weeklong date ordered rows, each starting with Sunday and ending with Saturday. FIG. 12 shows an example calendar UI information structure 1200 having twenty-one rows, which correspond to twenty-one weeks. Assume for example, that a date range of the calendar UI information structure 1200 corresponding to rows 1-13 is currently mapped to a corresponding calendar UI information structure of FIG. 1A. It will be appreciated that the calendar UI instance of FIG. 1A can be displayed on multiple different user devices, which may have different screen display sizes. Assume, for example, that a first user device (not shown) has a screen size large enough to display a first date range (date range 1) and that a second user device (not shown) has a screen size large enough to display a second date range (date range 1), and that date range 1 is smaller than a date range 2. Referring to FIG. 12, further assume that date range 1 that is currently visible on the calendar UI instance 102 displayed by the first user device corresponds to rows 5-8 of the calendar UI information structure 1200, and that date range 2 that is currently visible on the calendar UI instance 102 displayed by the second user device corresponds to rows 4-8 of the calendar UI information structure 1200.

Although only four rows (rows 5-8) are visible in the first date range, and only five rows (4-8) are visible in the second date range, the calendar UI information structure 1200 includes multiple additional rows corresponding to dates earlier than the currently visible ranges and multiple rows corresponding to dates later than the currently visible date range that are mapped to code object identifiers matching the search request used to generate the calendar UI instance of FIG. 1A. In the example calendar UI information structure 1200, rows 1-13 have been mapped, and rows −1 to −4 and rows +1 to +4 have not been mapped. That is, code object identifiers corresponding to code objects having attributes that map attributes associated with the search request to which the UI information structure 1200 have been mapped to date pane information structures 1210 of the UI information structure 1200. However, code objects have not been mapped to rows −1 to −4, listed here in reverse chronological date order. Likewise, code objects have not been mapped to rows +1 to +4 listed here in forward chronological date order.

It will be appreciated that mapping of code identifiers to date indicia of the calendar UI information structured 1200 corresponding to date panes of the calendar UI instance 102 of FIG. 1A that are not currently visible facilitates speed of scrolling since the mapping occurs prior to a user actually requesting to view date panes. Moreover, it will be appreciated that in accordance with some embodiments, the calendar UI information structure 1200 organizes the rows independent of month boundaries. Thus, scrolling can occur smoothly and continuously, row-by-row, without breaks to occurrences of date boundaries. This smooth continuous scrolling can create the impression to a user that the calendar UI is infinitely scrollable in forward and reverse directions.

More particularly, the calendar UI information structure 1200 organizes rows in date order so that each row is preceded by a row corresponding to the immediately preceding week's dates and is followed by a row corresponding to the immediately following week's dates. As explained above, each date pane information structure 1210 corresponds to an individual date pane in the calendar UI instance. The calendar UI information structure associates code objects C1-C14 with respective date pane information structures 1210 of the calendar UI information structure 1200. As mentioned above, the example calendar UI information structure 1200 of FIG. 12 corresponds to the calendar UI instance 102 of FIG. 1A. Code objects C1-C14 mapped date pane information structures 1210 of the calendar UI information structure 1200 correspond to visual information structures displayed within corresponding display panes of the calendar UI instance 102 of FIG. 1A. In order to simplify the example and the drawing of FIG. 12, only one code object is shown associated with any given date pane information structure, although in the example calendar UI instance 102 of FIG. 1A, date pane June 26 actually is shown associated with three visual content items, each of which corresponds to a different code object, for example.

In some embodiments, the calendar UI information structure 1200 includes a month demarcation indicator 1202, which includes an expanded date indication that includes both the day and the month, used in determining date panes from which to begin and end incremental shading. In some embodiments, the calendar UI information structure also includes a reference date indicator 1204 associated with a date pane information structure 1210 that is associated with a reference date.

Referring to rows 4-8 of the example calendar UI information structure 1200, code object C11 visible in row 5 corresponds to visual content item displayed within the June 18 date pane of the calendar UI instance 102 of FIG. 1A. Code object C10 visible in row 6 corresponds to the content item displayed within the June 23 date pane of the calendar UI instance of FIG. 1A. Code object C1 visible in row 6 corresponds to the multiple visual content items displayed within the June 26 date pane of the calendar UI instance 102 of FIG. 1. As mentioned above, in order to simplify the example and the drawings, only one code object is shown associated with the June 26 date pane structure even though in fact there are three code objects associated with the June 26 date pane structure, one per displayed visual content item. Code object C2 visible in row 7 corresponds to the visual content item displayed within the June 30 date pane of the calendar UI instance of FIG. 1A. Code object C3 visible in row 7 corresponds to the visual content item displayed within the July 1 date pane of the calendar UI instance of FIG. 1A. Code object C4 visible in row 7 corresponds to the visual content item displayed within the July 4 date pane of the calendar UI instance 102 of FIG. 1A.

As explained above, the example calendar UI information structure 1200 also includes rows that correspond to calendar UI instance rows that are not currently visible. In particular, rows 1-4 and 9-13 of the calendar UI information structure correspond to calendar UI instance 102 rows that are not visible. It can be seen that code objects C5-C9 are mapped to date pane structures associated with not visible rows 9-13, and that code objects C12-C15 are mapped to date pane structures associated with not visible rows 1-4. Also, it can be seen that the illustrative example calendar UI information structure includes rows that have not been mapped. Rows +1 to +4 have not been mapped to code object identifiers. Rows −1 to −4 have not been mapped to code object identifiers.

Thus, it will be appreciated that the calendar UI information structure 1200 can be used to more efficiently scroll continuously scroll rows 1-13. As scrolling of a visible calendar UI instance 102 progresses and a new row comes into view on a device display screen, the visual content objects associated with date pane information structures 1210 structures of FIG. 12 corresponding to newly visible date panes of the calendar UI instance 102 of FIG. 1A are used by a rendering engine to generate corresponding visual content items within the newly appearing date panes of the calendar UI instance 102. However, scrolling cannot occur smoothly into rows +1 to +4 and rows −1 to −4, which have not been mapped. More particularly, in response to a client user device request to view rows within these ranges, the server system may invoke the mapping process of FIG. 11 to map additional rows of the information structure 1200 to the illustrative current calendar UI instance 102.

List View

FIG. 14 is an illustrative drawing of a list UI instance that corresponds to the calendar UI instance of FIG. 1A in accordance with some embodiments. The example list view 1402 of FIG. 14 is produced using the same example information structure 1200 of FIG. 12 that is used to produce the calendar UI instance 102 of FIG. 1A. It can be seen, for example, that the list view instance 1402 contains the same search query 1404 as the calendar UI instance 102: "Tasks in Weekly Marketing Meeting Agenda, Marketing & Sales Materials, or Goals Q2 2014". In accordance with some embodiments, the list view contains a more consolidated view of the tasks and can be sorted in different orders (such as priority, or alphabetically) and navigated between with the up and down arrows of the keyboard.

Figure 15:
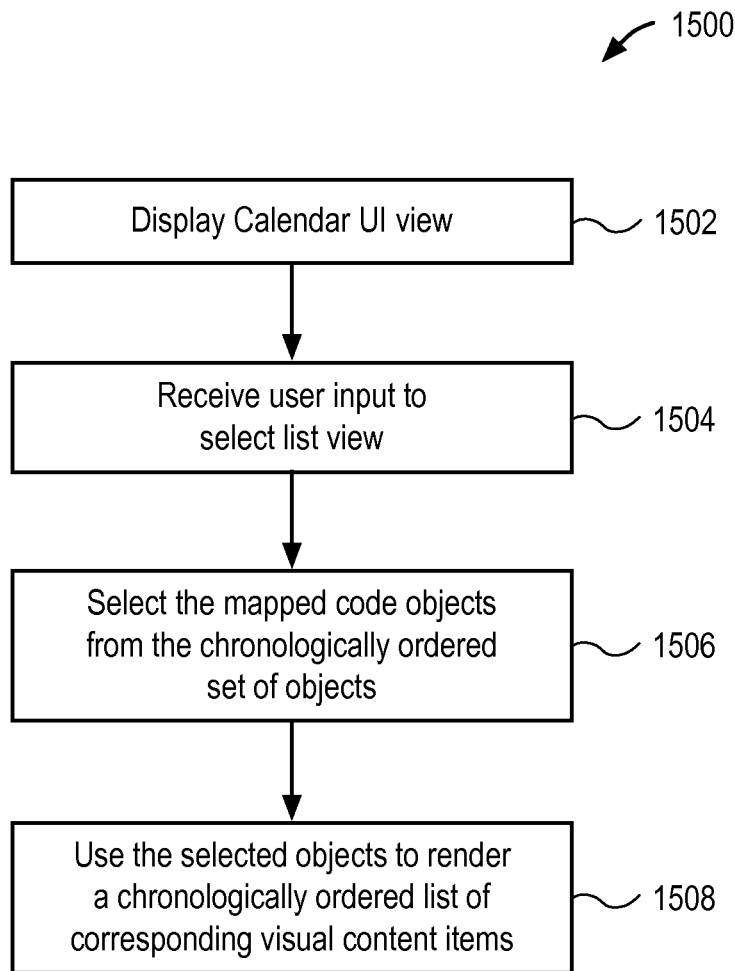
FIG. 15 is an illustrative flow diagram representing a process to generate a list view UI instance in accordance with some embodiments.

FIG. 15 is an illustrative flow diagram representing a process 1500 to generate a list view UI instance in accordance with some embodiments. Module 1502 configures a computer to display a calendar UI instance such as instance 102 in FIG. 1A, for example. Module 1504 configures the computer to receive user input to select a list view. Referring to the illustrative drawing of FIG. 1A, for example, a user may actuate the list button 104 to select a list view UI. Module 1506 configures the computer to select the chronologically ordered mapped code objects within the calendar UI information structure 1200. Referring to the illustrative calendar UI information structure 1200 of FIG. 12, for example, code objects C1 to C15 are selected. Module 1508 configures the computer to use the selected chronologically ordered code objects to generate a chronologically ordered list of visual content items for display. For example, the selected chronologically ordered code objects can be used to generate the illustrative list view UI instance of FIG. 14.

Figure 16:
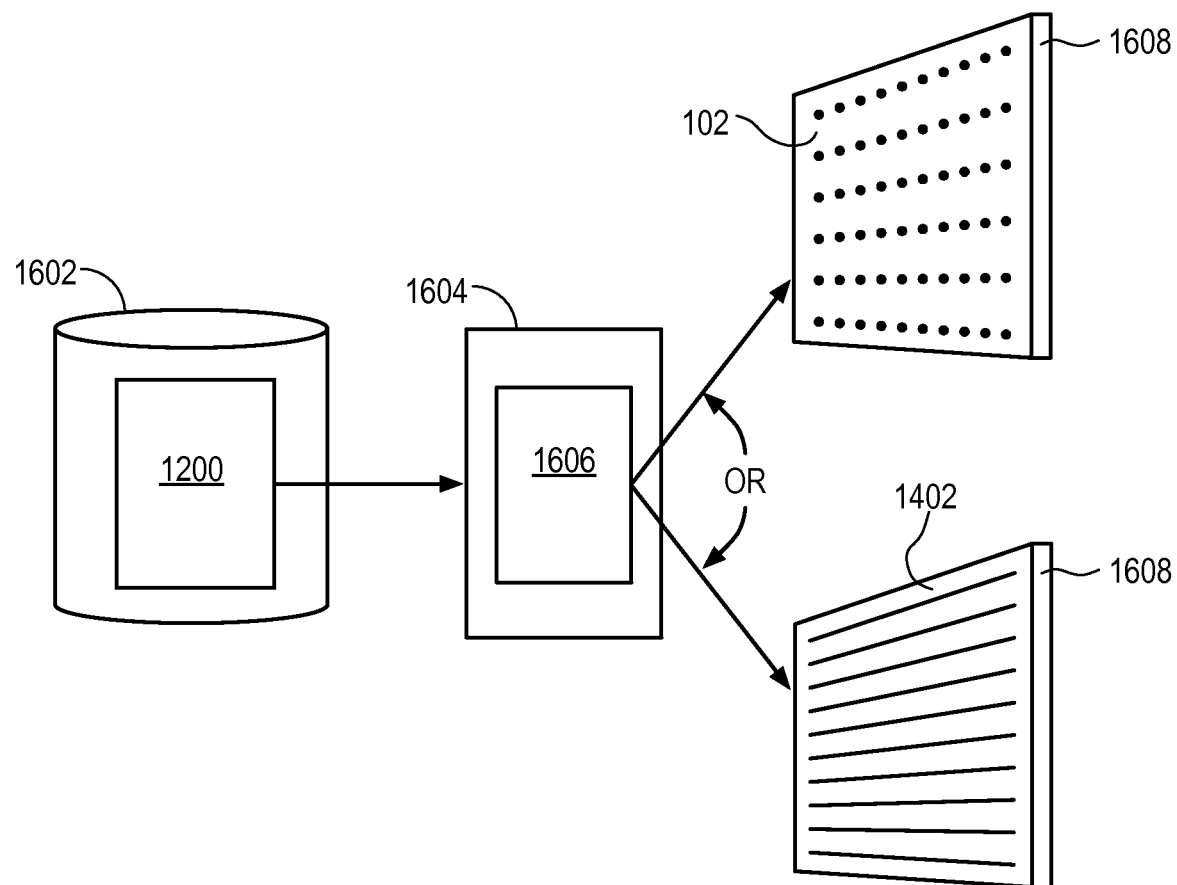
FIG. 16 is an illustrative drawing representing rendering of alternative representations of a calendar UI information structure of FIG. 12 in accordance with some embodiments.

Use of Calendar UI Information Structure to Render either Calendar UI or List UI Instance FIG. 16 is an illustrative drawing representing rendering of alternative representations of a calendar UI information structure of FIG. 12 in accordance with some embodiments. The example calendar UI information structure 1200 of FIG. 12 is stored in a non-transitory storage device 1602. A computer system 1604 hosts a rendering device 1606, such as a Browser of an end-user device, for example. The rendering device receives the calendar UI information structure 1200 and uses it to render on a display screen 1608 either a calendar UI instance 102 of FIG. 1A or to render on the same display screen 1608 a list UI instance 1402 of FIG. 14.

Screen Size

Figure 17:
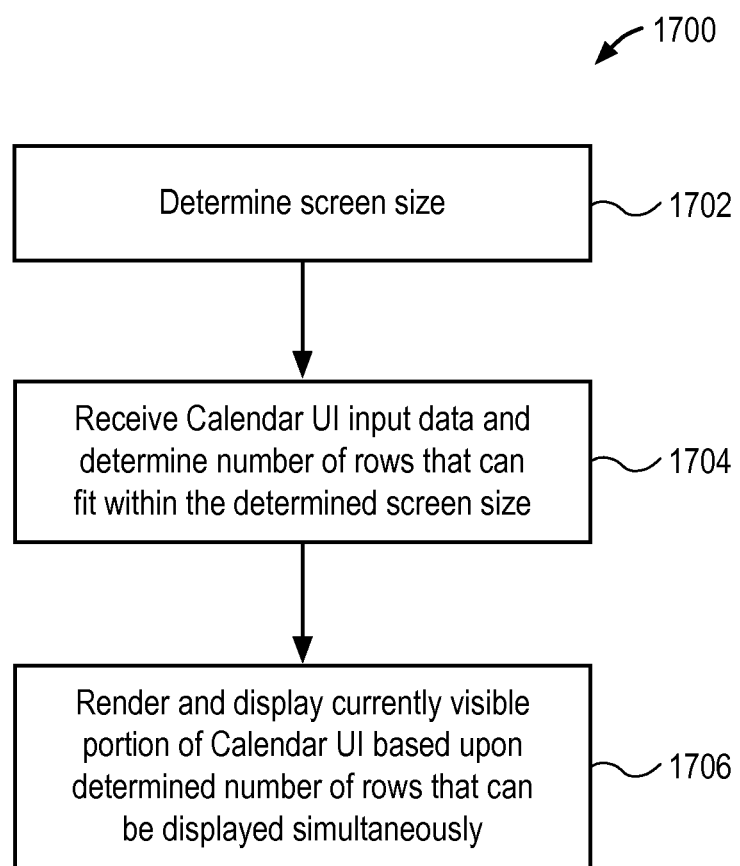
FIG. 17 is an illustrative drawing representing a process to determine number of rows of a calendar UI instance to display in accordance with some embodiments.

FIG. 17 is an illustrative drawing representing a client device process 1700 to determine number of rows of a calendar UI instance to display in accordance with some embodiments. Module 1702 configures a computer to determine screen size using a browser API as explained above, for example. Module 1704 configures the computer to receive the calendar UI information structure and to determine how many rows can fit within the screen. Module 1706 configures the computer to render a currently visible portion of the calendar UI instance based upon the number of rows that are determined to fit within the screen size.

Referring to the example information structure of FIG. 12, a determination by module 1704 that a screen is large enough to display five rows might result in rows 4 to 8 being displayed simultaneously on a client device display screen. However, a determination by module 1704 that a screen is large enough to display only four rows might result in only rows 5 to 8 being displayed simultaneously. Thus, the number of calendar UI instance rows displayed may depend upon screen size.

Scroll vs. Jump

Figure 18:
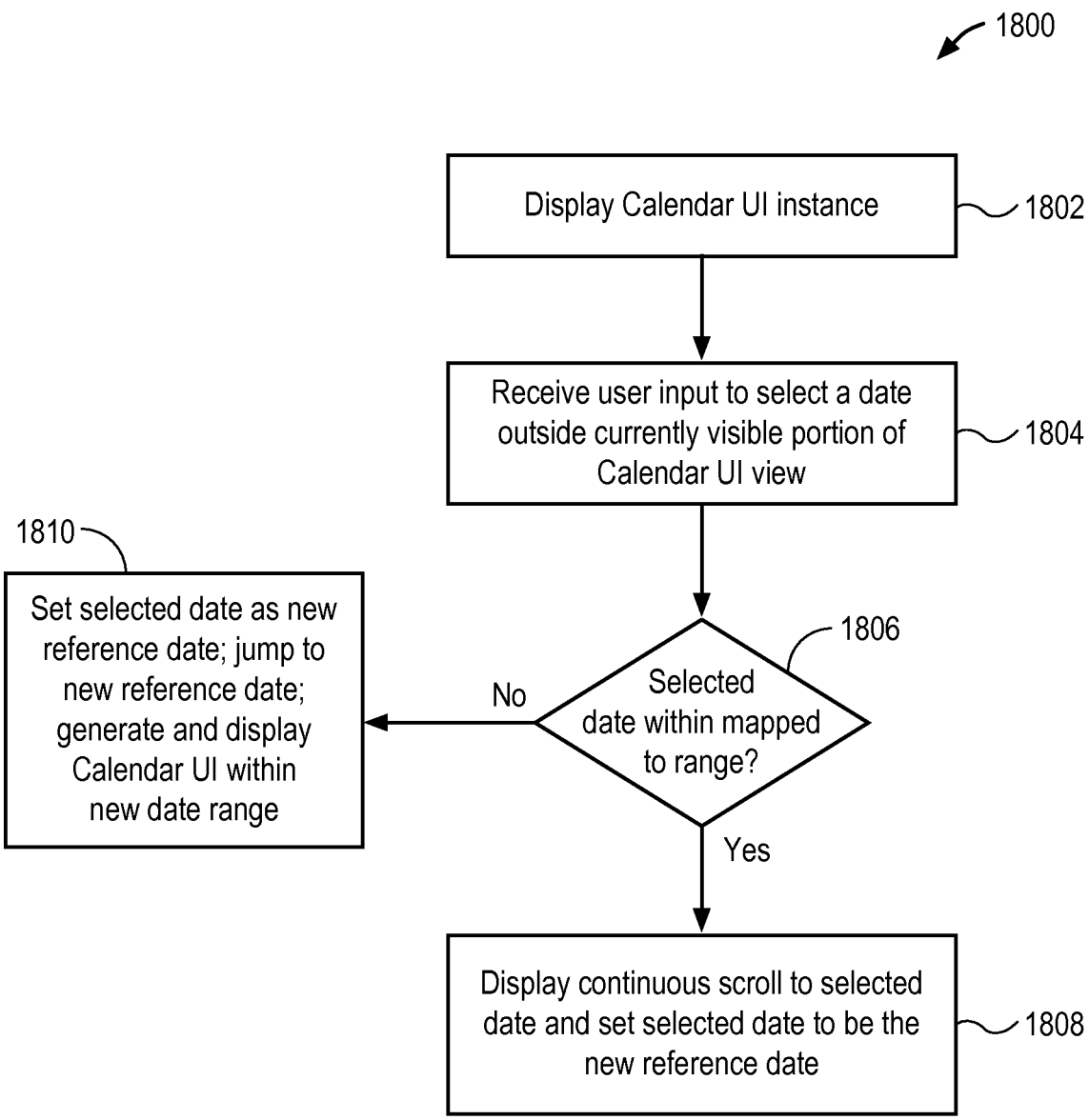
FIG. 18 is an illustrative drawing representing a process to determine whether to display scrolling to a selected date pane or to display a jump to a selected date pane in accordance with some embodiments.

FIG. 18 is an illustrative drawing representing a process 1800 to determine whether to display scrolling to a selected date pane or to display a jump to a selected date pane in accordance with some embodiments. Module 1802 configures a client user device (not shown) to display a calendar UI instance. Module 1804 configures the user device to receive user input to select a date outside of a currently visible portion of the calendar UI instance. Referring to the example calendar UI instance 102 of FIG. 1A, for example, a user may use the date selection field 106 to select a date range for the calendar UI instance. It will be appreciated that continuous scrolling may require a client user device to request code object information from a server device for use to generate a display of a visual content item within a newly visible date pane, for example. Alternately, a server (not shown) may proactively send to a user device code object information, without an affirmative user device request for it, that is associated with dates adjacent to a currently visible date range so that a user device can immediately use those code objects to generate new visual content items for newly visible dates if a user scrolls in to those dates. Decision module 1806, which may be implemented by a server, determines in response to a user device request for code object information, whether the newly selected date is within a contiguous currently mapped date range. Referring to the illustrative calendar UI information structure 1200 of FIG. 12, for example, dates in weeks 1-13 are within the mapped date range, and dates within weeks +1 to +4 and dates within weeks −1 to −4 are outside the currently mapped date range. In response to a determination that the newly selected date is within the currently mapped date range, module 1808 configures the server to send to a user device code object information used to generate visual content items for the newly selected date. The user device uses the code object information to display continuous scrolling of rows from a visible portion of the calendar UI instance to a newly visible portion of the calendar UI instance. It will be appreciated that continuous scrolling provides a user with a sense of the continuity of time between the two dates. It will be appreciated that if a server proactively sends the code object information to user device for a newly scrolled to date range, then a user device need not request the code object information in order to scroll. The newly selected date is set as the reference date within the newly visible portion. In response to a determination that the newly selected date is not within the contiguous currently mapped date range, and instead is in an extended date range for which mapping information that has not been delivered to the user device, module 1810 configures the server to provide additional calendar UI information structure information according to one or more of the process of FIGS. 6-7 and 9-11 and to use the newly generated information to display a jump or scroll to a newly visible portion of the calendar UI instance. The newly selected date is set as the reference date within the newly visible portion.

Network Exchanges of Information

Figure 19:
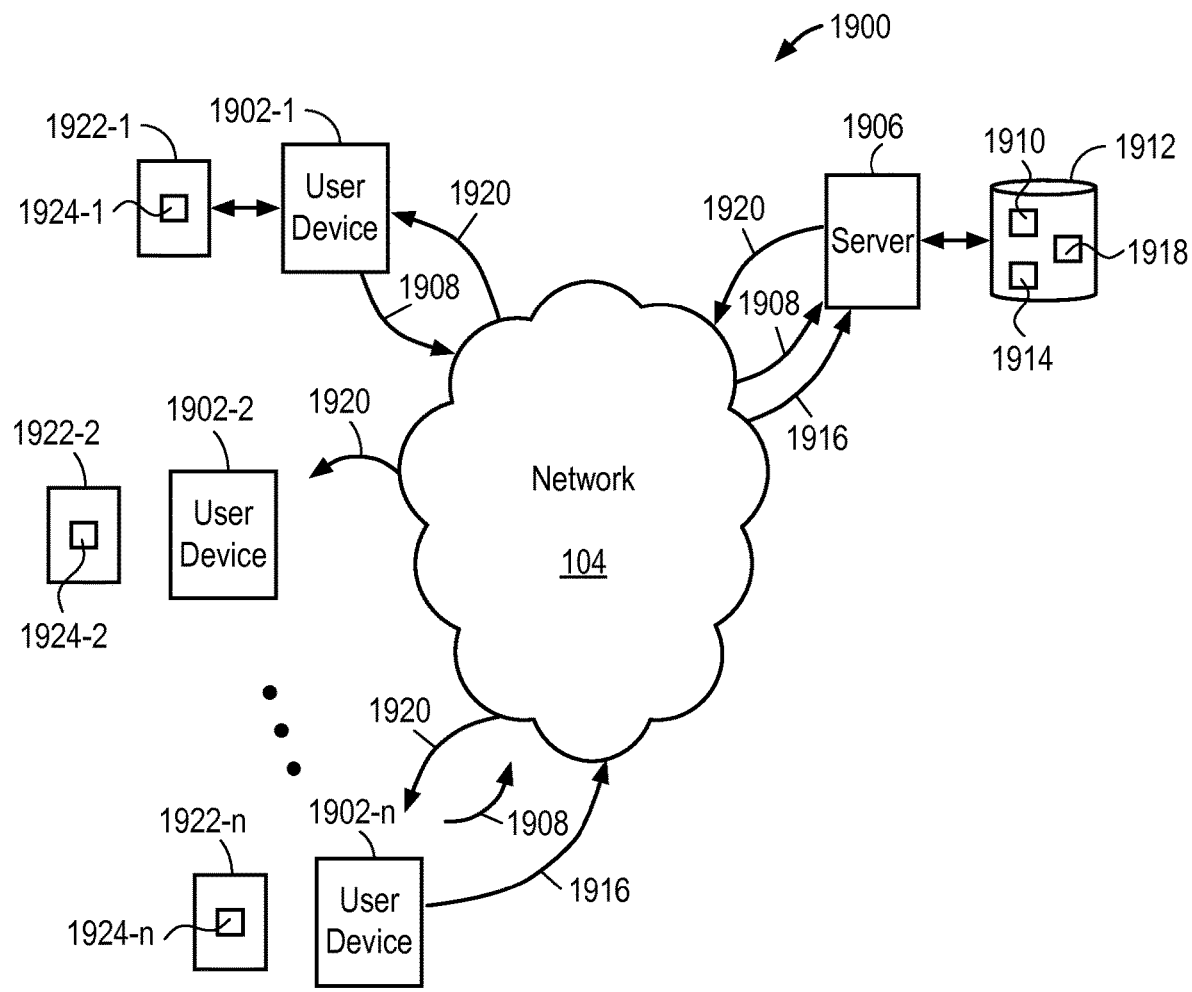
FIG. 19 is an illustrative drawing representing in general terms network communications between multiple user devices and a server device in accordance with some embodiments.

FIG. 19 is an illustrative drawing representing in a system 1900 in accordance with some embodiments. Multiple user devices 1902-1 to 1902-n communicate code objects, search queries, and information indicating matching code objects, over a communications network 1904 with a server 1906. The user devices 1902-1 to 1902-n may include any of numerous kinds of electronic devices such as a smartphone, media player, Personal Digital Assistant (PDA), cellular telephone, web appliance, personal computer, laptop computer or tablet computing device, for example. The communications network 104 may any one of a number of different types of networks and corresponding network interfaces such as a local area network ("LAN"), a wide area network ("WAN"), the Internet, mobile telephone networks, Plain Old Telephone (POTS) networks, and wireless data networks (e.g., WiFi and WiMax networks). The network may use well-known transfer protocols (e.g., HTTP. The server 1906 may include hardware computer systems disposed at one or more than one location and may include virtual machines, for example.

An illustrative example of the operation of the system 1900 is explained as follows. One or more of the user devices 1902-1 to 1902-n receive user input to create code objects that are used to generate visual content items. In accordance with some embodiments, the user input indicates attributes of the code objects. The user input associates the code objects with dates. In accordance with some embodiments, the user input is used to define corresponding code objects used to generate the visual content items. Arrows 1908 indicate that information indicative of the defined code objects is sent over the network 1904 to server 1906. The server 1906 stores the defined code objects 1910 in non-transitory storage device 1912. It is noted that some but not necessarily all user devices send information to define code objects. In this example, user device 1902-2 does not send code object identifying information. The server 1906 performs the processing to produce a chronologically ordered set of the code objects 1914 such as that shown in the illustrative drawing of FIG. 10.

One of the user devices, e.g. user device 1902-n, receives user input to define a search query and as indicated by arrow 1916, sends the query over the network 104 to the server 1906. The server 1906 performs the processing to produce a calendar UI information structure A118, such as that shown in the illustrative drawing of FIG. 12 that can be used to generate calendar UI information structure in response to the query. As indicated by arrows 1920, the server 1906 sends over the network 104 to each of multiple user devices 1902-1 to 1902-n information identifying code objects that match the search query and dates associated with the matching code objects for use in generating a calendar UI displaying visual content items corresponding to the matching code objects within date panes having the associated dates. Each user device 1902-1 to 1902-n has a corresponding display device 1922-1 to 1922-n. Each user device 1902-1 to 1902-n that receives the matching code objects produces a calendar UI instance 1924- to 1924-n on its corresponding screen. As explained above, the server may from time-to-time send additional code objects to support user scrolling to different date ranges. Alternatively, the server 1906 may send the information identifying matching code objects and associated dates to only a subset of the multiple user devices 1902-1 to 1902-n.

Example Machine Architecture

Figure 20:
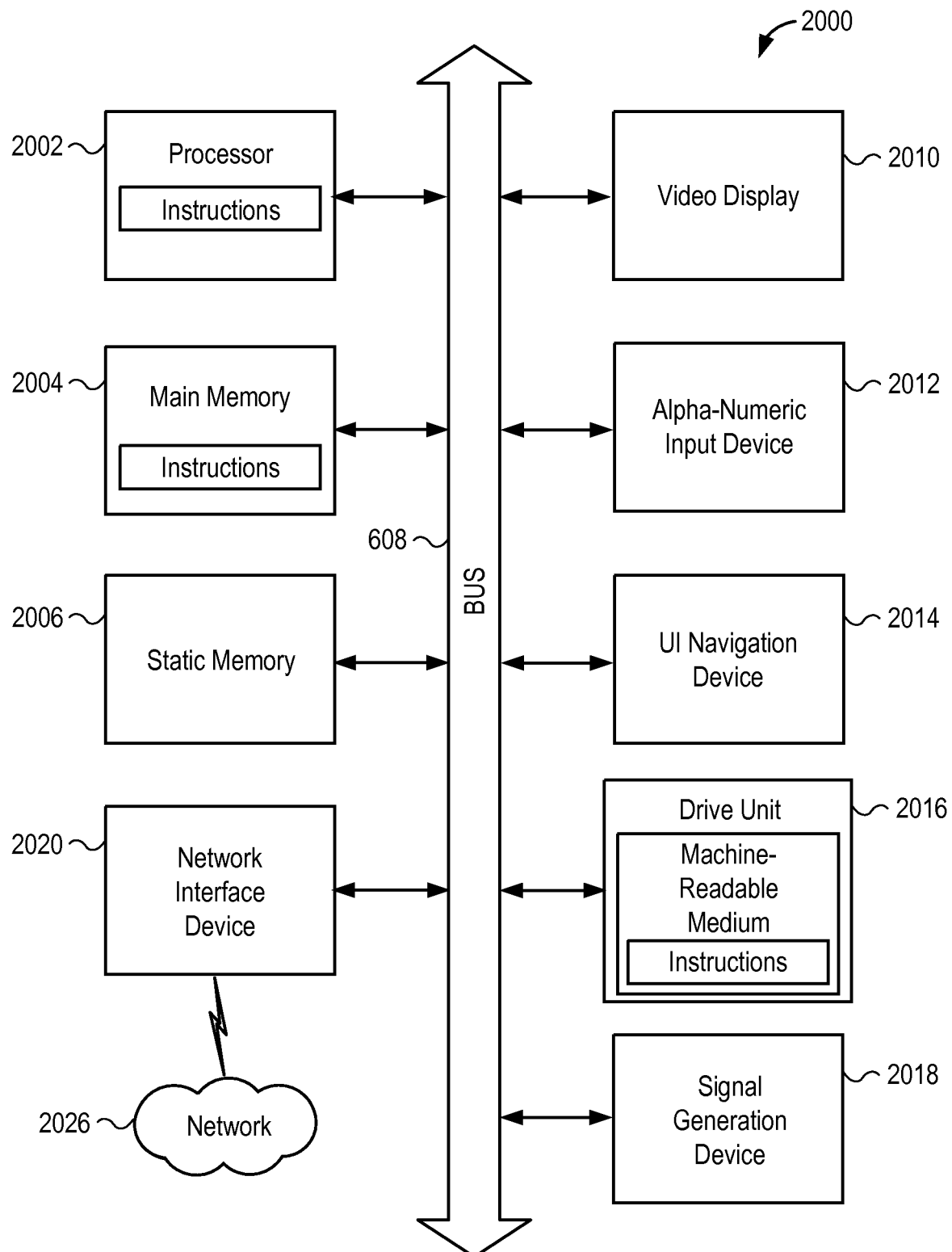
FIG. 20 is a block diagram of machine in the example form of a computer system within which a set instructions, for causing the machine to perform any one or more of the methodologies discussed herein, may be executed.

FIG. 20 is an illustrative block diagram of machine in the example form of a computer system 2000 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2000 includes a processor 2002 (e.g., a central processing unit (CPU), a graphics processing unit (GPU) or both), a main memory 2004 and a static memory 2006, which communicate with each other via a bus 2008. The computer system 2000 may further include a video display unit 2010 (e.g., a liquid crystal display (LCD) or a cathode ray tube (CRT)). The computer system 2000 also includes an alphanumeric input device 2012 (e.g., a keyboard), a user interface (UI) navigation device 2014 (e.g., a mouse), a disk drive unit 2016, a signal generation device 2018 (e.g., a speaker) and a network interface device 2020 to send and receive code objects and search queries, and information indicating matching code objects, for example.

The foregoing description and drawings of embodiments in accordance with the present invention are merely illustrative of the principles of the invention. Therefore, it will be understood that various modifications can be made to the embodiments by those skilled in the art without departing from the spirit and scope of the invention, which is defined in the appended claims.

The invention claimed is:

1. A method to display a calendar user interface comprising:

assigning individual shading levels to individual dates within a visible range of the calendar user interface, a forward date mapping range outside of the visible range, and a backward date mapping range outside of the visible range, the calendar user interface having a display grid in the visible range that includes display grid date panes associated with the individual dates, wherein the display grid shows an individual month wherein the individual shading levels are assigned to the individual dates in the individual month to increment from a first date of the individual month to a last date of the individual month, wherein incrementing of the individual shading levels assigned to the individual dates from the first date of the individual month to the last date of the individual month results in each successive day of the individual month becoming progressively darker the closer the individual dates are to the last date of the individual month, with the first date of the individual month having a lightest shade level and the last date of the individual month having a darkest shade level, and wherein the individual shading levels assigned to the individual dates are maintained for the individual dates and recur for successive months so as to provide a sharp visual transition in shading between the darkest shade level of the last date of the individual month and a subsequent lightest shade level of a subsequent first date of a subsequent month; and displaying on a device display screen the visible range of the calendar user interface, wherein the display grid date panes have background shading in accordance with the individual shading levels assigned for the individual dates within the visible range, the forward date mapping range, and the backward date mapping range, and are arranged in rows corresponding to weeks and columns corresponding to days of a week such that continuous scrolling of the calendar user interface is facilitated without breaks or interruptions at month boundaries between the successive months and while providing the sharp visual transition in shading between the darkest shade level of the last date of the individual month and the subsequent lightest shade level of the subsequent first date of the subsequent month so that the sharp visual transition in shading is provided between each of the successive months.

2. The method of claim 1, further comprising:

determining a reference date within the visible range of the calendar user interface; and determining the forward date mapping range and the backward date mapping range outside of the visible range of the calendar user interface based on the reference date.

3. The method of claim 2, further comprising:

mapping visual content items to the display grid date panes in both the forward date mapping range and the backward date mapping range, such that the visual content items are mapped to the display grid date panes outside of the visible range in the forward date mapping range and the backward date mapping range to facilitate the continuous scrolling without the breaks or interruptions at the month boundaries.

4. The method of claim 3, further comprising:

receiving user input to cause the continuous scrolling.

5. The method of claim 1, wherein the continuous scrolling is vertical scrolling.

6. The method of claim 5, wherein the continuous scrolling is in week-by-week increments.

7. The method of claim 1, further comprising:

displaying a new month indicator on the subsequent first date of the subsequent month in addition to the sharp visual transition in shading.

8. A system configured to display a calendar user interface, the system comprising:

one or more physical processors configured by machine-readable instructions to:

assign individual shading levels to individual dates within a visible range of the calendar user interface, a forward date mapping range outside of the visible range, and a backward date mapping range outside of the visible range, the calendar user interface having a display grid in the visible range that includes display grid date panes associated with the individual dates, wherein the display grid shows an individual month wherein the individual shading levels are assigned to the individual dates in the individual month to increment from a first date of the individual month to a last date of the individual month, wherein incrementing of the individual shading levels assigned to the individual dates from the first date of the individual month to the last date of the individual month results in each successive day of the individual month becoming progressively darker the closer the individual dates are to the last date of the individual month, with the first date of the individual month having a lightest shade level and the last date of the individual month having a darkest shade level, and wherein the individual shading levels assigned to the individual dates are maintained for the individual dates and recur for successive months so as to provide a sharp visual transition in shading between the darkest shade level of the last date of the individual month and a subsequent lightest shade level of a subsequent first date of a subsequent month; and effectuate displaying on a device display screen the visible range of the calendar user interface, wherein the display grid date panes have background shading in accordance with the individual shading levels assigned for the individual dates within the visible range, the forward date mapping range, and the backward date mapping range, and are arranged in rows corresponding to weeks and columns corresponding to days of a week such that continuous scrolling of the calendar user interface is facilitated without breaks or interruptions at month boundaries between the successive months and while providing the sharp visual transition in shading between the darkest shade level of the last date of the individual month and the subsequent lightest shade level of the subsequent first date of the subsequent month so that the sharp visual transition in shading is provided between each of the successive months.

9. The system of claim 8, wherein the one or more physical processors are further configured by the machine-readable instructions to:

determine a reference date within the visible range of the calendar user interface; and determine the forward date mapping range and the backward date mapping range outside of the visible range of the calendar user interface based on the reference date.

10. The system of claim 9, wherein the one or more physical processors are further configured by the machine-readable instructions to:

map visual content items to the display grid date panes in both the forward date mapping range and the backward date mapping range, such that the visual content items are mapped to the display grid date panes outside of the visible range in the forward date mapping range and the backward date mapping range to facilitate the continuous scrolling without the breaks or interruptions at the month boundaries.

11. The system of claim 10, wherein the one or more physical processors are further configured by the machine-readable instructions to:

receive user input to cause the continuous scrolling.

12. The system of claim 8, wherein the continuous scrolling is vertical scrolling.

13. The system of claim 12, wherein the continuous scrolling is in week-by-week increments.

14. The system of claim 8, wherein the one or more physical processors are further configured by the machine-readable instructions to:

display a new month indicator on the subsequent first date of the subsequent month in addition to the sharp visual transition in shading.

15. An article of manufacture including a non-transitory computer readable storage device encoded with computer readable code to configure a computer system to perform a process that comprises:

assigning individual shading levels to individual dates within a visible range of the calendar user interface, a forward date mapping range outside of the visible range, and a backward date mapping range outside of the visible range, the calendar user interface having a display grid in the visible range that includes display grid date panes associated with the individual dates, wherein the display grid shows an individual month wherein the individual shading levels are assigned to the individual dates in the individual month to increment from a first date of the individual month to a last date of the individual month, wherein incrementing of the individual shading levels assigned to the individual dates from the first date of the individual month to the last date of the individual month results in each successive day of the individual month becoming progressively darker the closer the individual dates are to the last date of the individual month, with the first date of the individual month having a lightest shade level and the last date of the individual month having a darkest shade level, and wherein the individual shading levels assigned to the individual dates are maintained for the individual dates and recur for successive months so as to provide a sharp visual transition in shading between the darkest shade level of the last date of the individual month and a subsequent lightest shade level of a subsequent first date of a subsequent month; and displaying on a device display screen the visible range of the calendar user interface, wherein the display grid date panes have background shading in accordance with the individual shading levels assigned for the individual dates within the visible range, the forward date mapping range, and the backward date mapping range, and are arranged in rows corresponding to weeks and columns corresponding to days of a week such that continuous scrolling of the calendar user interface is facilitated without breaks or interruptions at month boundaries between the successive months and while providing the sharp visual transition in shading between the darkest shade level of the last date of the individual month and the subsequent lightest shade level of the subsequent first date of the subsequent month so that the sharp visual transition in shading is provided between each of the successive months.

16. The article of manufacture of claim 15, wherein the process further comprises:

determining a reference date within the visible range of the calendar user interface; and determining the forward date mapping range and the backward date mapping range outside of the visible range of the calendar user interface based on the reference date.

17. The article of manufacture of claim 16, wherein the process further comprises:

mapping visual content items to the display grid date panes in both the forward date mapping range and the backward date mapping range, such that the visual content items are mapped to the display grid date panes outside of the visible range in the forward date mapping range and the backward date mapping range to facilitate the continuous scrolling without the breaks or interruptions at the month boundaries.

18. The article of manufacture of claim 17, wherein the process further comprises:

receiving user input to cause the continuous scrolling.

19. The article of manufacture of claim 15, wherein the continuous scrolling is vertical scrolling.

20. The article of manufacture of claim 19, wherein the continuous scrolling is in week-by-week increments.

* * * * *